US008093316B2

(12) United States Patent
Pearson et al.

(10) Patent No.: US 8,093,316 B2
(45) Date of Patent: Jan. 10, 2012

(54) POLYMER BLENDS

(75) Inventors: Jason Clay Pearson, Kingsport, TN (US); Douglas Stephens McWilliams, Kingsport, TN (US); Gether Irick, Jr., Gray, TN (US); Max Allen Weaver, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 1909 days.

(21) Appl. No.: 10/772,121

(22) Filed: Feb. 4, 2004

(65) Prior Publication Data
US 2004/0180997 A1 Sep. 16, 2004

(51) Int. Cl.
*C08K 5/3477* (2006.01)
(52) U.S. Cl. .......... 524/99; 524/100; 524/116; 524/117; 524/119; 524/126; 524/147; 524/151; 524/153
(58) Field of Classification Search ............ 524/99–100, 524/116–117, 119, 128, 147, 151, 153, 126
See application file for complete search history.

(56) References Cited

U.S. PATENT DOCUMENTS

| | | | |
|---|---|---|---|
| 3,169,121 A | 2/1965 | Goldberg | |
| 3,207,814 A | 9/1965 | Goldberg | |
| 3,953,539 A | 4/1976 | Kawase et al. | |
| 4,025,492 A | 5/1977 | Binsack et al. | |
| 4,088,709 A | 5/1978 | Seymour et al. | |
| 4,136,089 A | 1/1979 | Bier et al. | |
| 4,156,069 A | 5/1979 | Prevorsek et al. | |
| 4,176,224 A | 11/1979 | Bier et al. | |
| 4,188,314 A | 2/1980 | Fox et al. | |
| 4,194,038 A | 3/1980 | Baker et al. | |
| 4,208,527 A | 6/1980 | Horlbeck et al. | |
| 4,238,593 A | 12/1980 | Duh | |
| 4,287,325 A * | 9/1981 | Jackson et al. ................ 525/444 | |
| 4,331,586 A | 5/1982 | Hardy | |
| 4,374,961 A | 2/1983 | Kudo et al. | |
| 4,391,954 A | 7/1983 | Scott | |
| 4,393,158 A | 7/1983 | Miller | |
| 4,401,804 A | 8/1983 | Wooten et al. | |
| 4,430,484 A | 2/1984 | Quinn | |
| 4,452,932 A | 6/1984 | Burnelle | |
| 4,452,933 A | 6/1984 | McCready | |
| 4,456,717 A | 6/1984 | Eimers et al. | |
| 4,465,820 A | 8/1984 | Miller et al. | |
| 4,525,504 A * | 6/1985 | Morris et al. .................. 524/99 | |
| 4,532,290 A | 7/1985 | Jaquiss et al. | |
| 4,578,437 A * | 3/1986 | Light et al. .................... 525/444 | |
| 4,619,956 A | 10/1986 | Susi | |
| 4,786,692 A | 11/1988 | Allen et al. | |
| 4,879,355 A | 11/1989 | Light et al. | |
| 4,956,407 A | 9/1990 | Funasaki et al. | |
| 4,957,953 A | 9/1990 | Kikkawa et al. | |
| 4,972,015 A * | 11/1990 | Carico et al. .................. 524/303 | |
| 4,981,898 A | 1/1991 | Bassett | |
| 5,010,146 A | 4/1991 | Kohsaka et al. | |
| 5,011,877 A | 4/1991 | Morris et al. | |
| 5,032,631 A * | 7/1991 | Golder et al. .................. 524/101 | |
| 5,116,905 A | 5/1992 | Belfoure et al. | |
| 5,134,181 A | 7/1992 | Masina | |
| 5,180,762 A | 1/1993 | Canova | |
| 5,194,523 A | 3/1993 | Small, Jr. et al. | |
| 5,207,967 A | 5/1993 | Small, Jr. et al. | |
| 5,239,020 A | 8/1993 | Morris | |
| 5,254,610 A | 10/1993 | Small, Jr. et al. | |
| 5,283,295 A | 2/1994 | Light et al. | |
| 5,354,791 A | 10/1994 | Gallucci | |
| 5,420,212 A | 5/1995 | Light | |
| 5,441,997 A | 8/1995 | Walsh et al. | |
| 5,461,120 A | 10/1995 | Mason et al. | |
| 5,478,896 A | 12/1995 | Scott | |
| 5,606,007 A | 2/1997 | Sakashita et al. | |
| 5,656,715 A * | 8/1997 | Dickerson et al. ............. 528/271 | |
| 5,679,733 A | 10/1997 | Malik et al. | |
| 5,688,899 A * | 11/1997 | Strand et al. .................. 528/279 | |
| 5,714,530 A | 2/1998 | Waterman | |
| 5,719,217 A | 2/1998 | Gugumus | |
| 5,721,298 A | 2/1998 | Waterman | |
| 5,744,526 A | 4/1998 | Goossens et al. | |
| 5,744,554 A | 4/1998 | Pfaendner et al. | |
| 5,859,073 A * | 1/1999 | Pfaendner et al. .............. 521/48 | |
| 5,859,116 A * | 1/1999 | Shih ............................... 524/493 | |
| 5,907,026 A | 5/1999 | Factor et al. | |
| 5,919,848 A * | 7/1999 | Minnick et al. ................ 524/128 | |

(Continued)

FOREIGN PATENT DOCUMENTS

EP 0294862 A1 12/1988

(Continued)

OTHER PUBLICATIONS

Anni Berger-Schunn, "Practical Color Measurement", (1994), pp. 39-56 and 91-98, Wiley, KY.
"Plastics Adhesive Handbook", 5th ed., (2001), pp. 98-108, Hanser Gardner Publications, Inc., Cincinnati, OH.
PCT International Search Report.
R.E. Wilfong, Linear:Polyesters, *Journal of Polymer Science*, 1961, pp. 385-410, 54.
Copending U.S. Appl. No. 11/204,864, filed Aug. 16, 2005.
Copending U.S. Appl. No. 11/204,869, filed Aug. 16, 2005.
Copending U.S. Appl. No. 11/204,460, filed Aug. 16, 2005.
Copending U.S. Appl. No. 10/639,712, filed Mar. 5, 2003.
Copending U.S. Appl. No. 11/204,870, filed Aug. 16, 2005.
Copending U.S. Appl. No. 11/204,461, filed Aug. 16, 2005.
Copending U.S. Appl. No. 11/204,867, filed Aug. 16, 2005.
Copending U.S. Appl. No. 10/392,575, filed Mar. 20, 2003.

(Continued)

*Primary Examiner* — Peter Szekely
(74) *Attorney, Agent, or Firm* — Betty Joy Boshears; Louis N. Moreno; Bernard J. Graves, Jr.

(57) ABSTRACT

Disclosed are polymer blends comprising a mixture of
(A) at least one polyester prepared by the reaction of at least one diol with at least one dicarboxylic acid or dialkyl ester thereof in the presence of a metallic catalyst;
(B) at least one phosphite ester compound; and
(C) at least one hindered amine light stabilizer.
The polymer blends exhibit improved color, especially when used as a component of a polyester/polycarbonate blend.

37 Claims, No Drawings

U.S. PATENT DOCUMENTS

| | | | |
|---|---|---|---|
| 5,922,816 A | 7/1999 | Hamilton | |
| 5,942,585 A | 8/1999 | Scott et al. | |
| 5,965,261 A | 10/1999 | Webster | |
| 5,965,643 A | 10/1999 | Gugumus | |
| 6,005,059 A | 12/1999 | Scott et al. | |
| 6,011,124 A | 1/2000 | Scott et al. | |
| 6,037,424 A | 3/2000 | Scott et al. | |
| 6,043,322 A | 3/2000 | Scott et al. | |
| 6,051,164 A | 4/2000 | Samuels | |
| 6,054,551 A * | 4/2000 | Cornell et al. | 528/176 |
| 6,077,890 A * | 6/2000 | Hudson et al. | 524/100 |
| 6,100,320 A * | 8/2000 | Cobb et al. | 524/399 |
| 6,103,796 A | 8/2000 | Staniek et al. | |
| 6,103,857 A * | 8/2000 | Jones et al. | 528/272 |
| 6,107,375 A | 8/2000 | Krishnan et al. | |
| 6,114,420 A | 9/2000 | Zedda et al. | |
| 6,187,523 B1 * | 2/2001 | Aylward et al. | 430/527 |
| 6,221,556 B1 | 4/2001 | Gallucci et al. | |
| 6,254,950 B1 | 7/2001 | Rogers et al. | |
| 6,277,905 B1 * | 8/2001 | Keep | 524/94 |
| 6,284,845 B1 * | 9/2001 | Panandiker et al. | 525/438 |
| 6,306,939 B1 | 10/2001 | Gupta et al. | |
| 6,323,291 B1 | 11/2001 | Mason et al. | |
| 6,333,113 B2 | 12/2001 | Sugie et al. | |
| 6,342,579 B2 * | 1/2002 | Jeon et al. | 528/279 |
| 6,348,591 B1 | 2/2002 | Gupta et al. | |
| 6,455,616 B1 | 9/2002 | Cogen | |
| 6,469,083 B1 * | 10/2002 | Opalko | 524/291 |
| 6,476,158 B1 | 11/2002 | England et al. | |
| 6,500,887 B1 | 12/2002 | Tobita et al. | |
| 6,509,399 B2 | 1/2003 | Gupta et al. | |
| 6,551,688 B2 * | 4/2003 | Moskala et al. | 428/141 |
| 6,727,303 B2 * | 4/2004 | Ono et al. | 524/261 |
| 6,780,917 B2 * | 8/2004 | Hashimoto et al. | 524/456 |
| 2002/0045022 A1 * | 4/2002 | Agniel et al. | 428/66.3 |
| 2002/0086953 A1 | 7/2002 | Williams et al. | |
| 2002/0128357 A1 | 9/2002 | Gossens et al. | |
| 2003/0109629 A1 * | 6/2003 | Pierre et al. | 524/513 |

FOREIGN PATENT DOCUMENTS

| | | |
|---|---|---|
| EP | 0295730 A1 | 12/1988 |
| EP | 0 466 137 A2 | 1/1992 |
| EP | 0 438 488 A1 | 5/1992 |
| EP | 0 483 488 A1 | 5/1992 |
| EP | 0 537 837 A1 | 4/1993 |
| EP | 0543125 A1 | 5/1993 |
| EP | 0 661 342 A1 | 7/1995 |
| EP | 0 675 159 A1 | 10/1995 |
| EP | 1 304 351 A1 | 4/2003 |
| GB | 1466154 | 3/1977 |
| GB | 1466261 | 3/1977 |
| JP | 04059852 | 6/1990 |
| JP | 04011660 | 1/1992 |
| JP | 04-059852 | 2/1992 |
| JP | 10-1602 A | 1/1998 |
| JP | 10-298439 | 11/1998 |
| JP | 10298439 | 11/1998 |
| WO | WO 02/053633 A2 | 7/2002 |
| WO | 2004/065472 A1 | 8/2004 |

OTHER PUBLICATIONS

USPTO Office Action dated Apr. 19, 2007 for copending U.S. Appl. No. 11/204,864.

USPTO Office Action dated Mar. 26, 2007 for copending U.S. Appl. No. 10/392,575.

USPTO Office Action dated May 16, 2007 for copending U.S. Appl. No. 10/639,712.

* cited by examiner

POLYMER BLENDS

FIELD OF THE INVENTION

This invention relates to stabilized polymer blends that may be used for films, sheets, or injection molded articles. Stabilization of the polymer blends includes a phosphorus-containing compound and a hindered amine light stabilizer (HALS). The stabilized polymer blends exhibit improved hydrolytic stability and weatherability.

BACKGROUND OF THE INVENTION

Transesterification reactions between the polycarbonate and polyesters can occur during melt blending that result in the deterioration of rheological and physical properties and generation of gaseous by products, such as carbon dioxide. In addition, melt blending of polycarbonate and polyesters can result in an unacceptable increase in color despite the fact that the components themselves are initially colorless. It is generally accepted that both transesterification and color generation during melt blending are promoted by metallic catalyst residues from the polycondensation processes used to manufacture polyesters. These problems are overcome in practice by addition of a stabilizer often referred to in the art as a catalyst deactivator or catalyst quencher that functions to deactivate the metallic catalyst residues. The use of phosphorus-containing compounds to deactivate metallic catalyst residues is disclosed in U.S. Pat. Nos. 4,532,290 and 4,401,804. Examples of phosphorus-containing compounds that are suitable as catalyst deactivators include bis(2,4-di-t-butylphenyl)pentaerythritol diphosphite (Ultranox 626 available from GE Specialty Chemicals), distearyl pentaerythritol diphosphite (Weston 619 available from GE Specialty Chemicals), and bis(2,4-dicumylphenyl) pentaerythritol diphosphite (Doverphos 9228 available from Dover Chemical Qorporation). It is known that phosphorus containing compounds partially hydrolyze to generate acidic species over time and during extrusion processing. Hydrolysis is a prerequisite for effective catalyst deactivation (see for example, *Polym. Eng. Sci.* 29(18) 1226 (1989), *Polym. Bull.* 21 327 (1989), and *J. Appl. Polym. Sci.* 40 977 (1990)). Inorganic phosphite ester compounds such as metal salts of phosphite ester compounds may also be used as catalyst quenchers; however, they may impart haze or loss of clarity to the blends. Stabilization of polycarbonate-polyester blends using phosphorus-containing compounds is disclosed in U.S. Pat. Nos. 3,953,539, 4,088,709, 4,532,290, 4,981,898, 5,441,997, 5,907,026, and 6,221,556.

The detrimental effect of phosphorus-containing catalyst quenchers on the hydrolytic stability of polycarbonate and polycarbonate-polyester blends is disclosed in U.S. Pat. Nos. 4,456,717, 5,354,791, 5,744,526, 6,103,796, 4,393,158, and 6,107,375. Improved hydrolytic stability for polycarbonates stabilized with phosphorus-containing compounds and siloxanes containing oxetane groups are disclosed in U.S. Pat. No. 4,456,717. Improved hydrolytic stability for polycarbonates stabilized with phosphorus-containing compounds and an oligomer or polymer containing at least one pendant cyclic iminoether group per molecule is disclosed in U.S. Pat. No. 6,107,375. Improved hydrolytic stability for polycarbonates stabilized with phosphorus-containing compounds and an epoxy compound is disclosed in U.S. Pat. No. 4,393,158. Improved hydrolytic stability for polycarbonate-polyester blends stabilized with phosphorus-containing compounds and a polyester having epoxy functionality is disclosed in U.S. Pat. No. 5,354,791. Improved hydrolytic stability for polycarbonates stabilized with phosphorus-containing compounds and hexamethylenetetraamine is disclosed in U.S. Pat. No. 5,744,526. Specifically, U.S. Pat. No. 5,744,526 teaches the addition of the amine to stabilize the phosphite against hydrolysis and consequently improving the hydrolytic stability of the polycarbonate composition. Similarly, improved hydrolytic stability of certain phosphorus containing compounds by addition of a hindered amine light stabilizer (HALS) is disclosed in U.S. Pat. No. 6,103,796.

There is a need in the art for compounds that are useful in deactivating metal catalyst residues in polycarbonate, polyesters and polyester/polycarbonate blends without compromising the hydrolytic stability or weatherability of the polymer composition.

SUMMARY OF THE INVENTION

The present invention relates to a polymer blend comprising:
(A) one or more polymers selected from the group consisting of polycarbonates and polyesters;
(B) one or more phosphorus-containing compounds; and
(C) one or more hindered amine light stabilizers.

The present invention provides stabilizer blends that are useful for deactivating metal catalyst residues in polycarbonates, polyesters, and polycarbonate-polyester blend compositions without compromising the hydrolytic stability or weatherability of the polymer composition. This invention more specifically provides unexpected improvements in hydrolytic stability and weatherability of polycarbonate-polyester blends stabilized with phosphorus-containing catalyst quenchers and hindered amine light stabilizers (HALS) as described herein.

DETAILED DESCRIPTION OF THE INVENTION

The present invention demonstrates the use of a combination of additives that improve the hydrolytic stability and weatherability of polyesters, polycarbonates, and polycarbonate-polyester blends. The present invention provides a polymer blend comprising:

(A) one or more polymers selected from the group consisting of polycarbonates and polyesters;
(B) one or more phosphorus-containing compound(s) having a formula consistent with the following formulae:

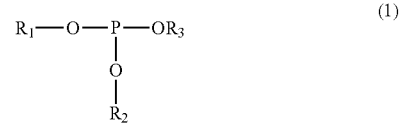

(1)

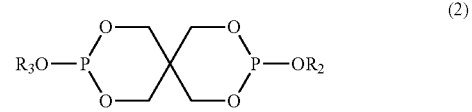

(2)

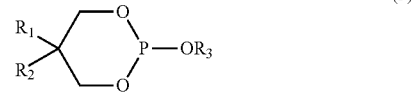

(3)

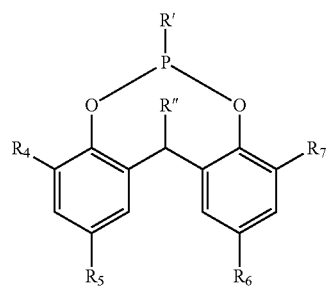

(4)

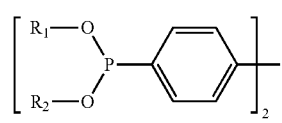

(5)

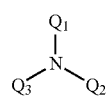

(6)

wherein
- $R_1$, $R_2$ and $R_3$ are independently selected from $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl;
- R' is selected from halogen or $OR_1$;
- R", $R_4$, $R_5$, $R_6$, and $R_7$ are independently selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, aryl;

each $Q_1$, $Q_2$ and $Q_3$ group is independently radical A, wherein radical A has the following structure:

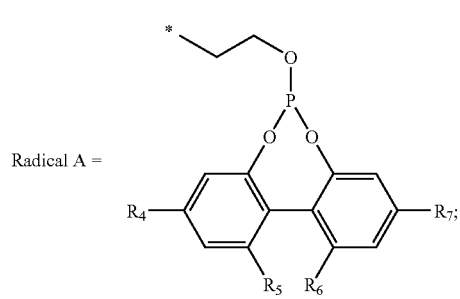

(C) one or more hindered amine light stabilizers (HALS) having a formula consistent with the following formulae:

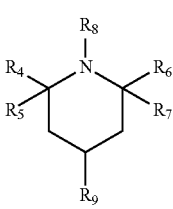

(7)

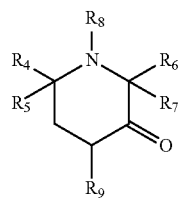

(8)

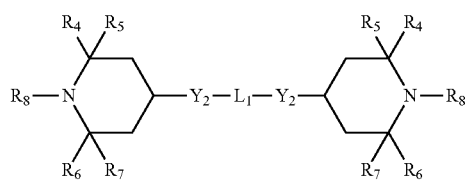

(9)

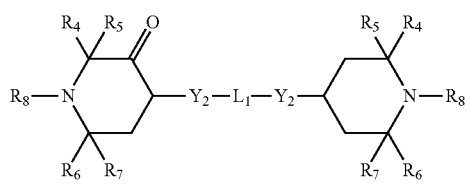

(10)

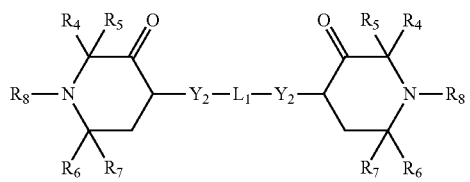

(11)

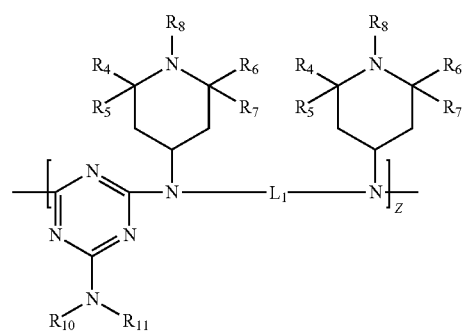

(12)

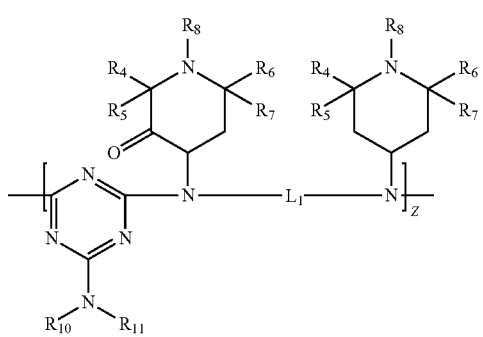

(13)

-continued
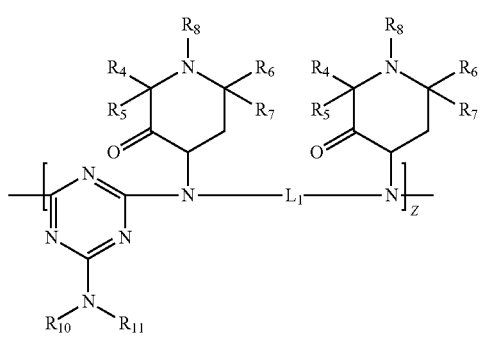
(14)
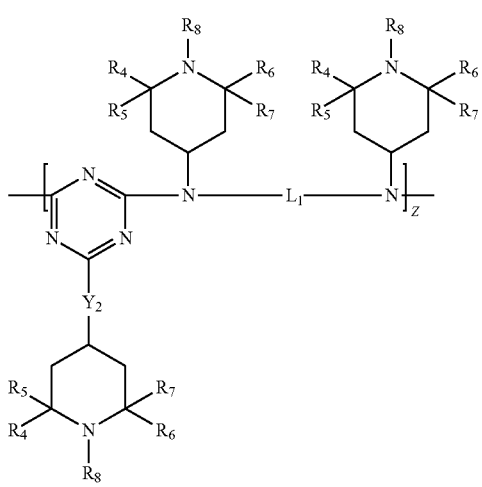
(15)
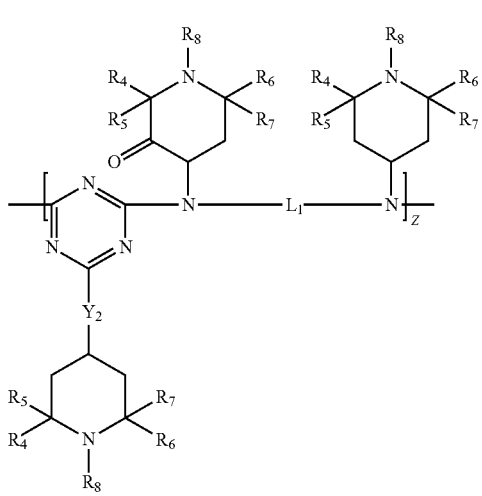
(16)
-continued
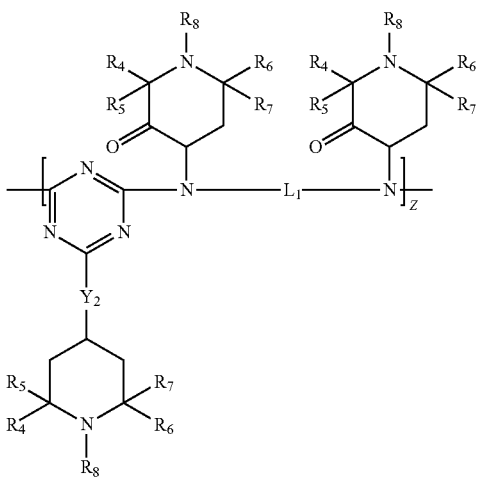
(17)
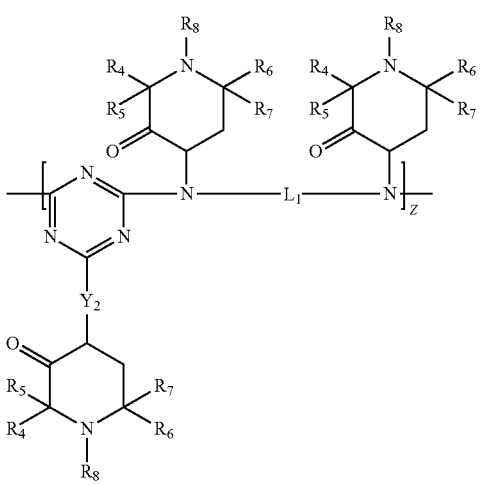
(18)
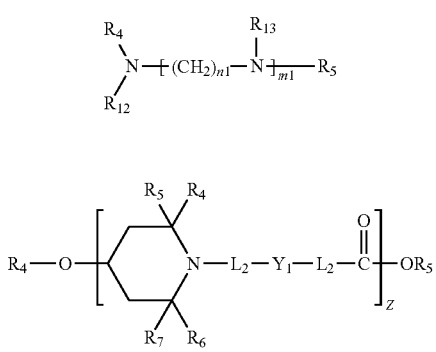
(19)
(20)
wherein
$R_8$ is selected from hydrogen, —$OR_6$, $C_1$-$C_{22}$-alkyl, substituted $C_1$-$C_{22}$-alkyl, $C_3$-$C_8$-cycloalkyl, substituted $C_3$-$C_8$-cycloalkyl;
$R_9$ is selected from hydrogen; $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, aryl, —$Y_1$—$R_4$ or a succinimido group having the formula:

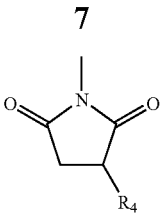

$R_{10}$ and $R_{11}$ are independently selected from hydrogen, $C_1$-$C_{22}$-alkyl, substituted $C_1$-$C_{22}$-alkyl, $C_3$-$C_8$-cycloalkyl, and substituted $C_3$-$C_8$-cycloalkyl;

$R_{10}$ and $R_{11}$ collectively may represent a divalent group forming a ring with the nitrogen atom to which they are attached, e.g., morpholino, piperidino and the like;

$L_1$ is a divalent linking group selected from $C_2$-$C_{22}$-alkylene; —$(CH_2CH_2-Y_1)_{1-3}$—$CH_2CH_2$—; $C_3$-$C_8$-cycloalkylene; arylene; or —CO-$L_2$-OC—;

$L_2$ is selected from $C_1$-$C_{22}$-alkylene, arylene, —$(CH_2CH_2-Y_1)_{1-3}$—$CH_2CH_2$— and $C_3$-$C_8$-cycloalkylene;

$Y_1$ is selected from —OC(O)—, —NHC(O)—, —O—, —S—, —N($R_4$)—;

$Y_2$ is selected from —O— or —N($R_4$)—;

Z is a positive integer of up to about 20, preferably up to about 6;

m1 is selected from 0 to about 10;

n1 is a positive integer selected from 2 to about 12;

$R_{12}$ and $R_{13}$ are independently selected from hydrogen, $C_1$-$C_{22}$-alkyl, substituted $C_1$-$C_{22}$-alkyl, heteroaryl, and radical B wherein radical B is selected from the following structures:

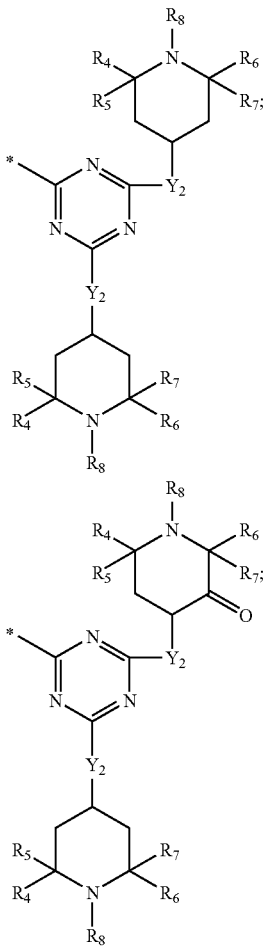

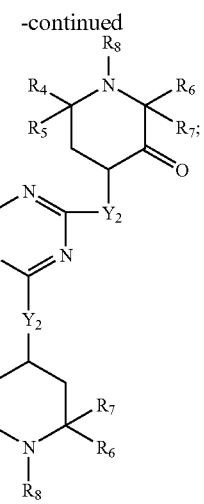

Radical B structures wherein * designates the position of attachment.

wherein at least one of $R_{12}$ and $R_{13}$ is radical B.

It is preferred that the polymer composition(s) contain up to about 0.5 weight percent, preferably, from about 0.15 to 0.35 weight percent, of the phosphorus-containing species and up to about 1.0 weight percent, preferably, from about 0.1 weight percent to about 0.75 weight percent, of the HALS based on the total weight of the polymer composition.

Wherever an R group, L group, Y group, Z group, m group or n group is defined herein, the definition for a particular group remains the same throughout this description regardless of whether it is used for multiple formulas or types of compounds unless otherwise specified.

The term "aryl" is used to denote an aromatic radical containing 6, 10 or 14 carbon atoms in the conjugated aromatic ring structure and these radicals substituted with one or more groups selected from $C_1$-$C_6$-alkyl; $C_1$-$C_6$-alkoxy; phenyl, and phenyl substituted with $C_1$-$C_6$-alkyl; $C_1$-$C_6$-alkoxy; halogen and the like; $C_3$-$C_8$-cycloalkyl; halogen; hydroxy, cyano, trifluoromethyl and the like. Typical aryl groups include phenyl, naphthyl, phenylnaphthyl, anthryl (anthracenyl) and the like. The term "heteroaryl" is used to describe conjugated cyclic radicals containing at least one hetero atom selected from sulfur, oxygen, nitrogen or a combination of these in combination with from two to about ten carbon atoms and these heteroaryl radicals substituted with the groups mentioned above as possible substituents on the aryl radical. Typical heteroaryl radicals include: 2- and 3-furyl, 2- and 3-thienyl, 2- and 3-pyrrolyl, 2-, 3-, and 4-pyridyl, benzothiophen-2-yl; benzothiazol-2-yl, benzoxazol-2-yl, benzimidazol-2-yl, 1,3,4-oxadiazol-2-yl, 1,3,4-thiadiazol-2-yl, 1,2,4-thiadiazol-5-yl, isothiazol-5-yl, imidazol-2-yl, quinolyl and the like.

The terms "$C_1$-$C_6$-alkoxy" and "$C_2$-$C_6$-alkanoyloxy" are used to represent the groups —O—$C_1$-$C_6$-alkyl and —OCOC$_1$-$C_6$-alkyl, respectively, wherein "$C_1$-$C_6$-alkyl" denotes a saturated hydrocarbon that contains 1-6 carbon atoms, which may be straight or branched-chain, and which may be further substituted with one or more groups selected from halogen, methoxy, ethoxy, phenyl, hydroxy, acetyloxy and propionyloxy. The term "halogen" is used to represent fluorine, chlorine, bromine, and iodine; however, chlorine and bromine are preferred.

The term "$C_2$-$C_{22}$-alkylene" is used to denote a divalent hydrocarbon radical that contains from two to twenty-two carbons and which may be straight or branched chain and which may be substituted with one or more substituents selected from hydroxy, halogen, $C_1$-$C_6$-alkoxy, $C_2$-$C_6$-alkanolyloxy and aryl. The term "$C_3$-$C_8$-cycloalkylene" is used to denote divalent cycloaliphatic radicals containing three to eight carbon atoms and these are optionally substituted with one or more $C_1$-$C_6$-alkyl groups. The term "arylene" is used to denote 1,2-, 1,3-, and 1,4-phenylene radicals and these optionally substituted with $C_1$-$C_6$-alkyl, $C_1$-$C_6$-alkoxy and halogen.

The terms "phosphorus-containing compound(s)" includes but is not limited to compounds sold under the following tradenames: Irgafos TNPP (Ciba Specialty Chemicals, CAS# 26523-78-4), Irgafos 168 (Ciba Specialty Chemicals, CAS# 31570-04-4), Ultranox 626 (GE Specialty Chemicals, CAS# 26741-53-7), Mark PEP 36 (Asahi Denka Co., Ltd., CAS#80693-00-1), Mark HP-10 (Asahi Denka Co., Ltd., CAS# 140221-14-3), Irgafos P-EPQ (Ciba Specialty Chemicals, CAS# 38613-77-3), Sandostab P-EPQ (Clariant Corp., CAS# 119345-01-6), Ethanox 398 (Albemarle Corp., CAS# 118337-09-0), Weston 618 (GE Specialty Chemicals, CAS# 3806-34-6), Irgafos 12 (Ciba Specialty Chemicals, CAS# 80410-33-9), Irgafos 38 (Ciba Specialty Chemicals, CAS# 145650-60-8), Ultranox 641 (GE Specialty Chemicals, CAS# 161717-324), Doverphos S-9228 (Dover Chemical Corp. CAS# 15486243-8) and the like. More preferred are bis(2,4-di-t-butylphenyl)pentaerythritol diphosphite (Ultranox 626 available from GE Specialty Chemicals), distearyl pentaerythritol diphosphite (Weston 619 available from GE Specialty Chemicals), and bis(2,4-dicumylphenyl)pentaerythritol diphosphite (Doverphos 9228 available from Dover Chemical Corporation). The most preferred is distearyl pentaerythritol diphosphite (Weston 619 available from GE Specialty Chemicals).

The term "HALS" include but are not limited to Cyasorb UV-3346 (Cytec Industries, CAS# 90751-07-8), Cyasorb UV-3529 (Cytec Industries, CAS# 193098-40-7), Cyasorb UV-3641 (Cytec Industries, CAS# 106917-30-0), Cyasorb UV-3581 (Cytec Industries, CAS# 79720-19-7), Cyasorb UV 3853 (Cytec Industries, CAS# 167078-06-0), Cyasorb UV-3853 (Cytec Industries, CAS# 24860-22-8), Tinuvin 622 (Ciba Specialty Chemicals, CAS# 65447-77-0), Tinuvin 770 (Ciba Specialty Chemicals, CAS# 52829-07-9), Tinuvin 144 (Ciba Specialty Chemicals, CAS# 63843-89-0), Tinuvin 123 (Ciba Specialty Chemicals, CAS# 129757-67-1), Chimassorb 944 (Ciba Specialty Chemicals, CAS# 71878-19-8), Chimassorb 119 (Ciba Specialty Chemicals, CAS# 10699043-6), Chimassorb 2020 (Ciba Specialty Chemicals, CAS# 192268-64-7), Lowilite 76 (Great Lakes Chemical Corp., CAS# 41556-26-7), Lowilite 62 (Great Lakes Chemical Corp., CAS# 65447-77-0), Lowilite 94 (Great Lakes Chemical Corp., CAS# 71878-19-8), Uvasil 299LM (Great Lakes Chemical Corp., CAS# 182635-99-0), and Uvasil 299HM (Great Lakes Chemical Corp., CAS# 182635-99-0), Dastib 1082 (Vocht a.s., CAS# 131290-28-3), Uvinul 4049H (BASF Corp., CAS# 109423-00-9), Uvinul 4050H (BASF Corp., CAS# 124172-53-8), Uvinul 5050H (BASF Corp., CAS# 199237-39-3), Mark LA 57 (Asahi Denka Co., Ltd., CAS# 64022-61-3), Mark LA 52 (Asahi Denka Co., Ltd., CAS# 91788-83-9), Mark LA 62 (Asahi Denka Co., Ltd., CAS# 107119-91-5), Mark LA 67 (Asahi Denka Co., Ltd., CAS# 100631-43-4), Mark LA 63 (Asahi Denka Co., Ltd. Co., Ltd. Co., CAS# 115055-30-6), Mark LA 68 (Asahi Denka Co., Ltd., CAS# 100631-44-5), Hostavin N 20 (Clariant Corp., CAS# 95078-42-5), Hostavin N 24 (Clariant Corp., CAS# 85099-51-1, CAS# 85099-50-9), Hostavin N 30 (Clariant Corp., CAS# 78276-66-1), Diacetam-5 (GTPZAB Gigiena Truda, USSR, CAS# 76505-58-3), Uvasorb-HA 88 (3V Sigma, CAS# 136504-96-6), Goodrite UV-3034 (BF Goodrich Chemical Co., CAS# 71029-16-8), Goodrite UV-3150 (BF Goodrich Chemical Co., CAS# 96204-36-3), Goodrite UV-3159 (BF Goodrich Chemical Co., CAS# 130277-45-1), Sanduvor 3050 (Clariant Corp., CAS# 85099-51-0), Sanduvor PR-31 (Clariant Corp., CAS# 147783-69-5), UV Check AM806 (Ferro Corp., CAS# 154636-12-1), Sumisorb TM-061(Sumitomo Chemical Company, CAS# 84214-94-8), Sumisorb LS-060 (Sumitomo Chemical Company, CAS# 99473-08-2), Uvasil 299 LM (Great Lakes Chemical Corp., CAS# 164648-93-5), Uvasil 299 HM (Great Lakes Chemical Corp., CAS# 164648-93-5), Nylostab S-EED (Clariant Corp., CAS# 42774-15-2). Additional preferred hindered amine light stabilizer may be listed in the *Plastic Additives Handbook* 5$^{th}$ *Edition* (Hanser Gardner Publications, Inc., Cincinnati, Ohio, USA, 2001).

The hindered amine light stabilizers having above formulas (12), (13), (14), (15), (16), (17), (18) and (19) represent the preferred basic compounds. Chimassorb 944 (Ciba Specialty Chemicals, CAS# 71878-19-8), Cyasorb UV-3529 (Cytec Industries, CAS# 19309840-7), Chimassorb 119 (Ciba Specialty Chemicals, CAS# 10699043-6) and Tinuvin 770 (Ciba Specialty Chemicals, CAS# 52829-07-9) and any equilavents thereof are specific examples of the preferred basic compounds. A more preferred groups of the basic nitrogen compounds are the hindered amine light stabilizers having above formulas (12), (13), (14), (15), (16), (17), (18) and (19) wherein radical $R_8$ is hydrogen or alkyl. The most preferred are HALS that contain an sp$^3$-hybridized nitrogen atom that is not contained within the substituted piperidine ring. These HALS are typically commercially available polymeric or oligomer, high molecular weight HALS wherein the molecular weight is greater than about 1000 such as Cyasorb UV-3529 (Cytec Industries, CAS# 193098-40-7). The most preferred HALS correspond to formula (12) set forth above wherein $R_4$=$R_5$=$R_6$=$R_7$=$R_8$=methyl, $(R_{10})(R_{11})N$— collectively represent morpholino, $L_1$ is hexamethylene, and Z is 1 to 6.

The polyester of component (A) includes linear amorphous or crystalline thermoplastic polyesters produced by conventional polymerization techniques from one or more diols and one or more dicarboxylic acids or ester-forming equivalent thereof such as a dicarboxylate ester. The polyesters normally are molding or fiber grade and have an inherent viscosity (I.V.) of about 0.4 to about 1.2 dL/g measured at 25° C. in a 60/40 ratio by weight of phenol/tetrachloroethane. Typical polyesters of component (A) comprise:

(1) diacid residues comprising at least 50 mole percent terephthalic acid residues, 1,4-cyclohexanedicarboxylic acid residues or a mixture thereof; and (2) diol residues comprising at least 50 mole percent of ethylene glycol residues, cyclohexanedimethanol residues, or a mixture thereof;

wherein the total of the diacid residues is equal to 100 mole percent and the total of the diol residues also is equal to 100 mole percent. The polyesters of component (A) typically contain up to about 200 ppmw of metal catalyst residues, e.g., 10 to 200 ppmw Ti, Co and/or Mn residues.

The diol residues of the component (A) polyesters may be derived from one or more of the following diols: 2,6-decahydronaphthalenedimethanol, ethylene glycol, 1,4-cyclohexanedimethanol, 1,2-propanediol, 1,3-propanediol, 1,4-butanediol, 2,2-dimethyl-1,3-propanediol, 1,6-hexanediol, 1,2-cyclohexanediol, 1,4-cyclohexanediol, 1,2-, 1,3- and 1,4-cyclohexanedimethanol, 2,2,4,4-tetramethyl-1,3-cyclobutanediol, bis[4-(2-hydroxyethoxy)phenyl]sulfone, 1,4:3,6-dianhydro-sorbitol, 4,4'-iso-propylidenedicyclohexanol, Z-8-bis(hydroxymethyl)-tricyclo-[5.2.1.0]-decane wherein Z represents 3, 4, or 5; and diols containing one or more oxygen atoms in the chain, e.g., diethylene glycol, triethylene glycol, dipropylene glycol, tripropylene glycol and the like. In general, these diols contain 2 to 18, preferably 2 to 8 carbon atoms. Cycloaliphatic diols can be employed in their cis or trans configuration or as mixtures of both forms.

The diacid residues of the component (A) polyesters may be derived from a variety of aliphatic, alicyclic, and aromatic dicarboxylic acids. Examples of the dicarboxylic acids from which the diacid residues may be obtained include 2,6-decahydronaphthalenedicarboxylic acid, terephthalic acid, isophthalic acid, 1,4-cyclohexanedicarboxylic acid, 1,3-cyclohexanedicarboxylic acid, succinic acid, glutaric acid, adipic acid, sebacic acid, 1,12-dodecanedioic acid, 2,6-naphthalene-dicarboxylic acid and the like. The diacid residues may be obtained from the dicarboxylic acid or ester forming derivatives thereof such as esters of the dicarboxylic acid, e.g., dimethyl dicarboxylate esters, acid halides and, in some cases, anhydrides.

One or more branching agents also may be useful in making the polyesters formed within the context of the invention. Although not required, it is preferred that the optional branching agent is present in polyester component (A) in an amount of less than 5 mole percent wherein the total mole percent of the dicarboxylic acid component equals 100 mole percent and the total mole percent of the diol component equals 100 mole %. The branching agent may provide branching in the acid unit portion of the polyester, or in the glycol unit portion, or it can be a hybrid. Some of these branching agents have already been described herein. However, illustrative of such branching agents are polyfunctional acids, polyfunctional glycols and acid/glycol hybrids. Examples include tri- or tetra-carboxylic acids, such as trimesic acid, pyromellitic acid and lower alkyl esters thereof and the like, and tetrols such as pentaerythritol. Also triols such as trimethylopropane or dihydroxy carboxylic acids and hydroxydicarboxylic acids and derivatives, such as dimethyl hydroxy terephthalate, and the like are useful within the context of this invention. Trimellitic anhydride is a preferred branching agent. The branching agents may be used either to branch the polyester itself or to branch the polyester/polycarbonate blend of the invention.

It is preferred that polyester component (A) comprise about 30 to 100 mole percent 1,4-cyclohexanedimethanol residues wherein the total mole percentages of diol residues of the polyester equals 100 mole percent. In this embodiment, it is also preferred that polyester component (A) comprises 0 to about 70 mole percent ethylene glycol residues. While the diacid residues present in this embodiment may be derived from any diacid, it is preferred that the diacid residues comprise terephthalic acid, isophthalic acid and/or 1,4-cyclohexanedicarboxylic acid residues. When terephthalic acid residues are present, polyester component (A) comprises about 65 to 100 mole percent terephthalic acid residues and about 0 to 35 mole percent isophthalic acid residues.

Thus, one group of preferred polyesters have an inherent viscosity of about 0.4 to 1.2, preferably 0.4 to 0.8, dL/g measured at 25° C. in a 60/40 ratio by weight of phenol/tetrachloroethane and comprise:
(1) diacid residues comprising about 80 to 100 mole percent terephthalic acid residues and about 0 to 20 mole percent isophthalic acid residues; and
(2) diol residues comprising about 40 to 100 mole percent, preferably 55 to 80 mole percent, 1,4-cyclohexanedimethanol residues and 0 to about 60 mole percent, preferably about 20 to 45 mole percent, ethylene glycol residues;

wherein the total of the diacid residues is equal to 100 mole percent and the total of the diol residues also is equal to 100 mole percent.

Another group of preferred polyesters have an inherent viscosity of about 0.4 to 1.2, preferably about 0.4 to 0.8, dL/g measured at 25° C. in a 60/40 ratio by weight of phenol/tetrachloroethane and comprise:
(1) diacid residues comprising about 65 to 83 mole percent, preferably about 70 to 80 mole percent, terephthalic acid residues and about 35 to 17 mole percent, preferably 30 to 20 mole percent, isophthalic acid residues; and
(2) diol residues comprising about 80 to 100 mole percent, preferably 90 to 100 mole percent, 1,4-cyclohexanedimethanol residues and about 0 to about 20 mole percent, preferably 0 to 10 mole percent, ethylene glycol residues; wherein the total of the diacid residues is equal to 100 mole percent and the total of the diol residues also is equal to 100 mole percent.

Yet another group of preferred polyesters have an inherent viscosity of about 0.4 to 1.2, preferably about 0.4 to 0.8, dUg measured at 25° C. in a 60/40 ratio by weight of phenol/tetrachloroethane and comprise:
(1) diacid residues comprising at least about 80 to 100 mole percent, preferably 90 to 100 mole percent, and more preferably 100 mole percent 1,4-cyclohexanedicarboxylic acid residues; and
(2) diol residues comprising about 80 to 100 mole percent, preferably 90 to 100 mole percent, most preferably 100 mole percent, 1,4-cyclohexanedimethanol residues and about 0 to about 20 mole percent, preferably 0 to 10 mole percent, most preferably 0 ethylene glycol residues;
wherein the total of the diacid residues is equal to 100 mole percent and the total of the diol residues also is equal to 100 mole percent.

In yet another preferred embodiment, the polyesters have an inherent viscosity of about 0.4 to 1.2, preferably about 0.4 to 0.8, dL/g measure at 25° C. in a 60/40 ratio by weight of phenol/tetrachloroethane and comprise:
(1) diacid residues comprising about 80 to 100 mole percent, preferably 80 to 99.9 mole percent, more preferably 90 to 100 mole percent, and even more preferably 90 to 99.9 mole percent, terephthalic acid residues and about 0 to 20 mole percent, preferably 0.1 to 20 mole percent, more preferably 0 to 10 mole percent, and even more preferably 0.1 to 10 mole percent, isophthalic acid residues; and
(2) diol residues comprising about 25 to 37 mole percent, preferably 28 to 34 mole percent, 1,4-cyclohexanedimethanol residues and about 75 to about 63 mole percent, preferably about 72 to 66 mole percent, ethylene glycol residues;
wherein the total of the diacid residues is equal to 100 mole percent and the total of the diol residues also is equal to 100 mole percent.

Even further, another group of preferred polyesters have an inherent viscosity of about 0.4 to 1.2, preferably about 0.5 to 1.0 dL/g measured at 25° C. in a 60/40 ratio by weight of phenol/tetrachloroethane and comprise:
(1) diacid residues comprising terephthalic acid residues from 0.01 to 100 mole percent, preferably at least 40 mole percent; more preferably, 80 to 100 mole percent, and even more preferably from 90 to 100 mole percent, and
(2) diol residues comprising about 52 to 75 mole percent, preferably 52 to 65 mole percent of, 1,4-cyclohexanedimethanol residues and about 25 to 48 mole percent, preferably 35 to 48 mole percent of ethylene glycol residues;

wherein the total of the diacid residues is equal to 100 mole percent and the total of the diol residues also is equal to 100 mole percent. Branching agents are preferred in this embodiment more preferably in the amount of 0.05 to 1.0 mole percent of a trifunctional monomer.

The linear polyesters may be prepared according to polyester-forming procedures and conditions well known in the art. For example, a mixture of one or more dicarboxylic acids, preferably aromatic dicarboxylic acids, or ester forming derivatives thereof, and one or more diols may be heated in the presence of an esterification catalyst and/or polyesterification catalysts at temperatures in the range of about 150 to about 300° C. and pressures in the range of from of atmospheric to about 0.2 Torr. Normally, the dicarboxylic acid or derivative thereof is esterified or transesterified with the diol(s) at atmospheric pressure and at a temperature at the lower end of the specified range. Polycondensation then is affected by increasing the temperature and lowering the pressure while excess diol is removed from the mixture. A preferred temperature range for a polyester condensation is about 260 to about 300° C.

Typical catalyst or catalyst systems for polyester condensation are well known in the art. For example, the catalysts disclosed in U.S. Pat. Nos. 4,025,492; 4,136,089; 4,176,224; 4,238,593; and 4,208,527, incorporated herein by reference, are deemed suitable in this regard. Further, R. E. Wilfong, Journal of Polymer Science, 54 385 (1961) sets forth typical catalysts which are useful in polyester condensation reactions. The most preferred catalysts are complexes of titanium, manganese and cobalt. It is understood that phosphorus-containing molecules can be added in addition to metal catalysts.

The term "polycarbonate" as used herein embraces those polycarbonates comprising repeating units or residues of the formula

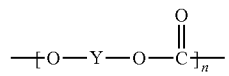

wherein Y is a divalent aromatic or aliphatic radical derived from a dihydroxyaromatic compound or a dihydroxyaliphatic compound of the formula HO—Y—OH. Typical dihydroxyaromatic compounds are 2,2-bis-(4-hydroxyphenyl) propane, also known as bisphenol A; bis(4-hydroxyphenyl) methane; 2,2-bis(4-hydroxy-3-methylphenyl)-propane; 4,4-bis(4-hydroxyphenyl)heptane; 2,2-(3,5,3',5'-tetrachloro-4, 4'-dihydroxyphenyl)propane; 2,2-(3,5,3',5'-tetrabromo-4,4'-dihydroxyphenol)propane; 3,3'-dichloro-3,3'-dichloro-4,4'-dihydroxydiphenyl)methane; 2,2'-dihydroxyphenyl-sulfone, and 2,2'-dihydroxyl phenylsulfide. Most preferably, HO—Y—OH is 2,2-bis-(4-hydroxyphenyl)propyl, in which case, the polycarbonate is a "bisphenol A polycarbonate". Examples of dihydroxyaliphatic compounds include 1,4-cyclohexanedimethanol, 1,2-propanediol, 1,3-propanediol, 1,4-butanediol, 2,2-dimethyl-1,3-propanediol, 1,6-hexanediol, 2,6-decahydronaphthalenedimethanol, 1,2-cyclohexane-diol, 1,4-cyclohexanediol, 1,2-cyclohexanedimethanol, 1,3-cyclohexanedimethanol, isosorbide, 4,4'-isopropylidenedicyclohexanol, 2,2,4,4-tetramethylcyclobutane-1,2-diol, Z,8-bis(hydroxymethyl)-tricyclo-[5.2.1.0]-decane wherein Z represents 3, 4, or 5; and diols containing one or more oxygen atoms in the chain, e.g., diethylene glycol, triethylene glycol, dipropylene glycol, tripropylene glycol and the like. In general, these diols contain 2 to 18, preferably 2 to 8 carbon atoms. Cycloaliphatic diols can be employed in their cis or trans configuration or as mixtures of both forms. Branched polycarbonates are also useful in the present invention.

The polycarbonates comprising component (A) of the above-described embodiment of the present invention may be prepared according to known procedures by reacting the dihydroxyaromatic compound with a carbonate precursor such as phosgene, a haloformate or a carbonate ester, a molecular weight regulator, an acid acceptor and a catalyst. Methods for preparing polycarbonates are known in the art and are described, for example, in U.S. Pat. No. 4,452,933, which is hereby incorporated by reference herein.

Examples of suitable carbonate precursors include carbonyl bromide, carbonyl chloride, and mixtures thereof; diphenyl carbonate; a di(halophenyl)carbonate, e.g., di(trichlorophenyl)carbonate, di(tribromophenyl)carbonate, and the like; di(alkylphenyl)carbonate, e.g., di(tolyl)carbonate; di(naphthyl)carbonate; di(chloronaphthyl)carbonate, or mixtures thereof; and bis-haloformates of dihydric phenols.

Examples of suitable molecular weight regulators include phenol, cyclohexanol, methanol, alkylated phenols, such as octylphenol, para-tertiary-butyl-phenol, and the like. The preferred molecular weight regulator is phenol or an alkylated phenol.

The acid acceptor may be either an organic or an inorganic acid acceptor. A suitable organic acid acceptor is a tertiary amine and includes such materials as pyridine, triethylamine, dimethylaniline, tributylamine, and the like. The inorganic acid acceptor can be either a hydroxide, a carbonate, a bicarbonate, or a phosphate of an alkali or alkaline earth metal.

The catalysts that can be used are those that typically aid the polymerization of the monomer with phosgene. Suitable catalysts include tertiary amines such as triethylamine, tripropylamine, N,N-dimethylaniline, quanternary ammonium compounds such as, for example, tetraethylammonium bromide, cetyl triethyl ammonium bromide, tetra-n-heptylammonium iodide, tetra-n-propyl ammonium bromide, tetramethyl ammonium chloride, tetra-methyl ammonium hydroxide, tetra-n-butyl ammonium iodide, benzyltrimethyl ammonium chloride and quaternary phosphonium compounds such as, for example, n-butyltriphenyl phosphonium bromide and methyltriphenyl phosphonium bromide.

The polycarbonate of component (A) also may be a copolyestercarbonate such as those described in U.S. Pat. Nos. 3,169,121; 3,207,814; 4,194,038; 4,156,069; 4,430,484, 4,465,820, and 4,981,898, all of which are incorporated by reference herein.

Copolyestercarbonates useful in this invention are available commercially. They are typically obtained by the reaction of at least one dihydroxyaromatic compound with a mixture of phosgene and at least one dicarboxylic acid chloride, especially isophthaloyl chloride, terephthaloyl chloride, or both.

The ratio of polyester component (A) to polycarbonate component (A) is not a critical feature of the present invention, and may be determined by the individual practitioner of this invention. Typically, the weight ratio of polyester (A) to polycarbonate (A) will range from about 99:1 to about 1:99, preferably from about 75:25 to about 25:75, and most preferably is about 75:25 to about 50:50. The compositions of the present invention also may contain one or more compounds selected from the group consisting of (D) phenolic antioxidants, (E) water, (F) colorants and pigments such as organic colorants, inorganic colorants and or white pigments such as $TiO_2$, ZnO and baryta, (G) ultraviolet light absorbers (H) additives such as impact modifiers, plasticizers, halogenated flame-retardants, fillers, nonhalogenated flame-retardants, synergists, processing aids, and other stabilizers known to one skilled in the art; and (I) a recycled polymer.

Another embodiment of the present invention is a polymer concentrate comprising:
(A) one or more polymers selected from the group consisting of polycarbonates and polyesters;
(B) one or more phosphorus-containing compounds; and/or
(C) one or more hindered amine light stabilizers.

The polymers, phosphorus containing compounds and the hindered amine light stabilizers useful for the concentrate are the same as described herein for other embodiments of the invention. The phosphorus compounds and the HALS compounds may be present separately in the concentrate but are preferably both present. However, whether or not each of the phosphorus containing compounds and the HALS compounds are present together or separately in the concentrate, each may be present in the concentrate in the amount of up to about 10 weight percent, preferably from 5 to 10 weight percent, based on the total weight of the concentrate. For the concentrate, the preferred polyester is one having 100 mole percent terephthalic acid residues, 62 mole percent 1,4-cyclohexanedimethanol residues, and 28 mole percent ethylene glycol residues based on a total mole percent for diacid residues of 100 mole percent and a total mole percent for diol residues of 100 mole percent. The preferred phosphite for the concentrate of the invention is Weston 619 as further described herein and the preferred HALS for the concentrate of the invention is Cyasorb UV-3529 as further described herein.

The term "ultraviolet (UV) light absorbers" is defined as one compound or a mixture of compounds that absorb light in the range of 250-400 nm with a minimal absorbance between 400 and 700 nm and that improves the weatherability of the polymer blends. Preferred examples are triazines, cyanoacrylates, benzotriazoles, naphthalenes, benzophenones, and benzoxazin-4-ones. More preferred are commercially available UV-absorbers such as: Cyasorb UV-9 (Cytec Industries, CAS# 131-57-7), Cyasorb UV-24 (Cytec Industries, CAS# 131-53-3), Cyasorb UV-531 (Cytec Industries, CAS# 1843-05-6), Cyasorb UV-2337 (Cytec Industries, CAS# 25973-55-1), Cyasorb UV-5411 (Cytec Industries, CAS# 3147-75-9), Cyasorb UV-5365 (Cytec Industries, CAS# 2440-22-4), Cyasorb UV-1164 (Cytec Industries, CAS# 2725-22-6), Cyasorb UV-3638 (Cytec Industries, CAS# 18600-59-4), Tinuvin 213 (Ciba Specialty Chemicals, CAS# 104810-47-1), Tinuvin 234 (Ciba Specialty Chemicals, CAS# 70321-86-7), Tinuvin 320 (Ciba Specialty Chemicals, CAS# 3846-71-7), Tinuvin 326 (Ciba Specialty Chemicals, CAS# 3896-11-5), Tinuvin 327 (Ciba Specialty Chemicals, CAS# 3864-99-1), Tinuvin 328 (Ciba Specialty Chemicals, CAS# 25973-55-1), Tinuvin 329 (Ciba Specialty Chemicals, CAS# 3147-75-9), Tinuvin 350 (Ciba Specialty Chemicals, CAS# 36437-37-3), Tinuvin 360 (Ciba Specialty Chemicals, CAS# 10359745-1), Tinuvin 571 (Ciba Specialty Chemicals, CAS# 23328-53-2) and Tinuvin 1577 (Ciba Specialty Chemicals, CAS# 147315-50-2). Additional suitable UV absorbers are listed in the *Plastic Additives Handbook 5th Edition* (Hanser Gardner Publications, Inc., Cincinnati, Ohio, USA, 2001). More preferred are benzotriazoles, triazines and benzoxazin-4-ones such as Cyasorb UV-1164 (Cytec Industries, CAS# 2725-22-6), Cyasorb UV-3638 (Cytec Industries, CAS# 18600-594), Tinuvin 1577 (Ciba Specialty Chemicals, CAS# 147315-50-2), Tinuvin 234 (Ciba Specialty Chemicals, CAS# 70321-86-7) and Tinuvin 328 (Ciba Specialty Chemicals, CAS#25973-55-1). Most preferred are Cyasorb UV-1164 (Cytec Industries, CAS# 2725-22-6), Cyasorb UV-3638 (Cytec Industries, CAS# 18600-59-4) and Tinuvin 1577 (Ciba Specialty Chemicals, CAS# 147315-50-2. It is obvious that identical molecules sold under different trade names are covered by this invention. It is obvious that combination of UV absorbers can be used.

The term "halogenated flame-retardants" is defined as compounds that can contain one or more of the following: fluorine, chlorine, bromine, and iodine, which act in such a way as to decrease the flammability of the polymer composition. More preferred are compounds that contain bromine such as brominated polycarbonate, brominated polystyrene, and the like. The compositions provided by the present invention are useful for improving the hydrolyitc stability of heavy-gauge sheet, cap layers for extruded sheet, cap layers for extruded films, thermoformable sheeting products, injection molded products, thin films, thick films, articles made using thin films, articles using from thick films, articles made using heavy gauge sheet, multilayer films, twin wall sheet, triple wall sheet and the like.

This invention can be further illustrated by the following examples of preferred embodiments thereof, although it will be understood that these examples are included merely for purposes of illustration and are not intended to limit the scope of the invention unless otherwise specifically indicated. Unless otherwise indicated, all weight percentages are based on the total weight of the polymer composition and all molecular weights are weight average molecular weights. Also, all percentages are by weight unless otherwise indicated. Wherever an R group, L group, Y group, Z group, m group or n group is defined herein, the definition for a particular group remains the same throughout this entire description, including the examples of the invention, regardless of whether it is used for multiple formulas or types of compounds unless otherwise specified.

EXAMPLES

In the examples, the following procedures were followed. Samples were cut from 20-mil film and then exposed to 70° C. and 100% relative humidity (RH) by suspending the films in the vapor space of sealed jars containing a small amount of water and placed inside a forced air oven set at 70° C. in order to evaluate hydrolytic stability. Small samples were subsequently taken periodically and the molecular weight distribution for the polyester and polycarbonate fractions determined using gel permeation chromatography (GPC). The GPC method for the polycarbonate fraction consisted of first immersing the blends in tetrahydrofuran to selectively extract the polycarbonate. The GPC system used to analyze the polycarbonate fraction consisted of a Perkin-Elmer LC-250 pump, a Perkin-Elmer LC-600 autosampler, and a Perkin-Elmer LC-235 photodiode array UV detector operated at 265 nm. The columns used were a Plgel 5-micron guard, a Mixed-C, and an Oligopore from Polymer Laboratories. The molecular weight distribution was computed using monodisperse polystyrene standards for calibration and the Mark-Houwink constants for polystyrene and polycarbonate available in the literature. The solvent used for the polyester fraction was 70/30-v/v hexafluoroisopropanol/methylene chloride mixture, which is also a good solvent for polycarbonate. The GPC system used consisted of a Perkin-Elmer LC-250 pump, a Perkin-Elmer ISS-200 autosampler, and a Perkin-Elmer LC-95 UV/VIS detector operated at 285 nm. The absorption coefficient of terephthalate based copolyesters at 285 nm is considerably greater than the coefficient for polycarbonate so that the method selectively detects the polyester. The columns used were a Plgel 5-micron guard and a Mixed-C from Polymer Laboratories. The molecular weight distribution was computed using monodisperse polystyrene standards for calibration and Mark-Houwink constants for polystyrene measured in this solvent. Universal calibration constants for the polyester were chosen to yield accurate molecular weight values for a series of polyester samples that were characterized by light scattering measurement.

Samples were cut from sheet to produce 2.5 by 5.5 inch samples and then exposed in a xenon arc Weather-Ometer sold by Atlas Devices, Inc. using an irradiation of 0.35 W/m² at 340 nm, inner and outer borosilicate filters, 55% relative humidity, 63° C. black panel temperature, and 18 minutes water spray out of every 2 hours irradiation. Samples were removed periodically to assess changes in color, haze, and impact strength.

The color of the polymer films is determined in a conventional manner using a HunterLab UltraScan Colorimeter manufactured by Hunter Associates Laboratory, Inc., Reston, Va. The instrument is operated using HunterLab Universal Software (version 3.8). Calibration and operation of the instrument is according to the HunterLab User Manual and is largely directed by the Universal Software. To reproduce the results on any colorimeter, run the instrument according to its instructions and use the following testing parameters: D65 Light Source (daylight, 6500° K color temperature), Reflectance Mode, Large Area View, Specular Included, CIE 10° observer, Outputs are CIE L*, a*, b*. An increase in the positive b* value indicates yellowness, while a decrease in the numerical value of b* indicates a reduction in yellowness. Color measurement and practice are discussed in greater detail in Anni Berger-Schunn in *Practical Color Measurement*, Wiley, N.Y. pages 39-56 and 91-98 (1994).

Haze was measured in a HunterLab UltraScan Colorimeter sold by Hunter Associates Laboratory, Inc. using the following testing parameters: D65 light source, transmittance mode, large area view, and CIE 10' observer.

Impact strength was determined by cutting 0.5 inch wide by 2.5 inch length bars and impacting them according to the ASTM D 256 method for Izod testing except that the test specimen was oriented 900 to the normal Izod method, i.e. the hammer strikes the 0.5 inch wide face of the specimen rather than the edge. In the case of samples exposed in a Weather-Ometer as described above, the impact strength was carried out with the exposed surface being struck by the hammer.

Unless otherwise indicated, all weight percentages are based on the total weight of the polymer composition and all molecular weights are weight average molecular weights. Also, all percentages are by weight unless otherwise indicated.

Examples 1-10

These examples illustrate the detrimental effect of a phosphorus-containing catalyst quencher on the hydrolytic stability of polycarbonate-polyester blends and the unexpected improvement in hydrolytic stability of the blends by the addition of a (HALS). In examples 1-6, polyester A is comprised of 74 mole percent terephthalic acid residues, 26 mole percent isophthalic acid residues and 100 mole percent 1,4-cyclohexanedimethanol residues, based on a total of 100 mole % diacid residues and a total of 100 mole % diol residues, having an inherent viscosity of about 0.74 dL/g and containing approximately 100 ppmw titanium metal and polycarbonate A is a bisphenol A polycarbonate (Makrolon 2608, supplied from Bayer Corporation). In examples 1-6, blends of polyester A and polycarbonate A (3:1 ratio by weight) were melt blended along with combinations of a phosphorus-containing stabilizer (a phosphite) tradename Doverphos 9228 (believed to be bis(2,4-dicumylphenyl)pentaerythritol diphosphite from the Dover Chemical Company) and a Chimassorb 944 (supplied by Ciba Specialty Chemicals) Chimassorb 944 is believed to be a polymeric HALS having a formula consistent with formula (12) wherein $R_4=R_5=R_6=R_7$=methyl; $R_8$=hydrogen; L, is hexamethylene; $R_{10}$=hydrogen; and $R_{11}$ is a branched octyl group. The additives were precompounded with polyester A using an 19-mm twin-screw extruder at 250° C., 200 RPM, at a rate of 5 lbs/hr to produce concentrates containing 5% additive. The blends were prepared as 20-mil extrusion cast films using a 1" Killion single-screw extruder at 275° C. and 70 RPM. The films were subsequently conditioned at 70° C. and 100% relative humidity for up to 3 weeks and the molecular weight of the polyester A and polycarbonate A components determined by GPC as previously described. The results are shown in Table 1. The blends containing the phosphite stabilizer exhibit significantly improved color (i.e. less yellow represented by lower b*) compared to blends without stabilizer (Example 1) or blends with the HALS (Example 6). Example 2 demonstrates the detrimental effect of the phosphite stabilizer on the hydrolytic stability of the blend, especially the polycarbonate A component. The blends containing both the phosphite stabilizer and the HALS (Examples 3, 4, and 5) exhibit significantly improved hydrolytic stability compared to the blend containing the phosphite (Example 2). These examples demonstrate that good color and improved hydrolytic stability of polycarbonate-polyester blends are realized by using a combination of a phosphite stabilizer and a HALS.

TABLE 1

| Example # | Doverphos 9228 (wt %) | Chimassorb 944 (wt %) | CIE Color b* | Time @ 70° C. & 100% RH | Polyester A | | Polycarbonate A | |
|---|---|---|---|---|---|---|---|---|
| | | | | | Mw | ΔMw (%) | Mw | ΔMw (%) |
| 1 | 0 | 0 | 6.27 | 0 | 21100 | — | 17217 | — |
| | | | | 1 | 21759 | 3.1 | 17451 | 1.4 |
| | | | | 2 | 21647 | 2.6 | 16248 | −5.6 |
| | | | | 3 | 21608 | 2.4 | 17728 | 3.0 |
| 2 | 0.25 | 0 | 0.08 | 0 | 21373 | — | 21636 | — |
| | | | | 1 | 21506 | 0.6 | 15950 | −26.3 |
| | | | | 2 | 20839 | −2.5 | 14251 | −34.1 |
| | | | | 3 | 20774 | −2.8 | 13466 | −37.8 |
| 3 | 0.25 | 0.25 | 0.2 | 0 | 22334 | — | 20013 | — |
| | | | | 1 | 22011 | −1.4 | 18106 | −9.5 |
| | | | | 2 | 21827 | −2.3 | 17817 | −11.0 |
| | | | | 3 | 21922 | −1.8 | 18301 | −8.5 |

TABLE 1-continued

| Example # | Doverphos 9228 (wt %) | Chimassorb 944 (wt %) | CIE Color b* | Time @ 70° C. & 100% RH | Polyester A Mw | Polyester A ΔMw (%) | Polycarbonate A Mw | Polycarbonate A ΔMw (%) |
|---|---|---|---|---|---|---|---|---|
| 4 | 0.25 | 0.50 | 0.48 | 0 | 21751 | — | 17401 | — |
|   |      |      |      | 1 | 22084 | 1.5 | 16907 | −2.8 |
|   |      |      |      | 2 | 21979 | 1.0 | 15655 | −10.0 |
|   |      |      |      | 3 | 21833 | 0.3 | 15466 | −11.1 |
| 5 | 0.50 | 0.25 | 0.33 | 0 | 22070 | — | 20728 | — |
|   |      |      |      | 1 | 22321 | 1.1 | 18125 | −12.5 |
|   |      |      |      | 2 | 21839 | −1.0 | 17580 | −15.2 |
|   |      |      |      | 3 | 21401 | −3.0 | 17248 | −16.8 |
| 6 | 0 | 0.25 | 4.44 | 0 | 21781 | — | 17100 | — |
|   |   |      |      | 1 | 21759 | −0.1 | 16134 | −5.6 |
|   |   |      |      | 2 | 21695 | −0.4 | 14623 | −14.5 |
|   |   |      |      | 3 | 21418 | −1.7 | 15542 | −9.1 |

In examples 7-10, polyester B is comprised of 100 mole percent terephthalic acid residues, 62 mole percent cyclohexandimethanol and 38 mole percent ethylene glycol residues having an inherent viscosity of about 0.7 and polycarbonate B is a bisphenol A polycarbonate (tradename Makrolon 1804 supplied by Bayer Corporation and believed to contain about 0.25 wt % of a ultraviolet light absorbing compound and a blue toner colorant). In Examples 7-10, blends of polyester B and polycarbonate B were melt blended along with combinations of a Weston 619 (a phosphite stabilizer, General Electric Specialty Chemicals, believed to be distearylpentaerythritol diphosphite) and Cyasorb UV-3529 (a polymeric HALS supplied by Cytec Industries Inc.) or Cyasorb UV-3346 (a polymeric HALS supplied by Cytec Industries, Inc.) Cyasorb UV-3529 is believed to be a polymeric HALS having a formula consistent with formula (12) wherein $R_4=R_5=R_6=R_7=R_8$=methyl; $L_1$ is hexamethylene; and $(R_{10})(R_{11})N$— collectively represent a morpholino group. Cyasorb UV-3346 is believed to be a polymeric HALS having a formula consistent with formula (12) wherein $R_4=R_5=R_6=R_7$=methyl; $R_8$=hydrogen; $L_1$ additives were precompounded with Polyester B using an 19-mm APV twin-screw extruder at 250° C., 200 RPM at a rate of 5 lbs/hr to make concentrates containing 5% additive. The blends were prepared as 20-mil extrusion cast films using a 1" Killion single-screw extruder at 275° C. and 70 RPM. The films were subsequently conditioned at 70° C. and 100% relative humidity for up to 6 weeks and the molecular weight of the polyester B and polycarbonate B components determined by GPC as previously described. The results are shown in Table 2. The results show that blends containing the phosphite stabilizer exhibit improved color (i.e. less yellow as represented by lower b*) compared to blends without stabilizer (Example 7). The results also show that blends containing the phosphite stabilizer and a HALS exhibit improved hydrolytic stability compared to blends containing the phosphite (Example 8). These examples demonstrate that good color and improved hydrolytic stability of polycarbonate-polyester blends are realized by using a combination of a phosphite stabilizer and a HALS.

TABLE 2

| Example | Weston 619 (wt %) | Cyasorb 3529 (wt %) | Cyasorb 3346 (wt %) | Color b* | Time @ 70° C. & 100% RH | Polyester B Mw | Polyester B ΔMw (%) | Polycarbonate B Mw | Polycarbonate B ΔMw (%) |
|---|---|---|---|---|---|---|---|---|---|
| 7 | 0 | 0 | 0 | 0.75 | 0 | 23377 | — | 22506 | — |
|   |   |   |   |      | 2 | 23756 | 1.6 | 21995 | −2.3 |
|   |   |   |   |      | 4 | 22884 | −2.1 | 19125 | −15.0 |
|   |   |   |   |      | 6 | 22472 | −3.9 | 19136 | −15.0 |
| 8 | 0.25 | 0 | 0 | −0.16 | 0 | 22877 | — | 22621 | — |
|   |      |   |   |       | 2 | 21064 | −7.9 | 14774 | −34.7 |
|   |      |   |   |       | 4 | 19321 | −15.5 | 11515 | −49.1 |
|   |      |   |   |       | 6 | 17755 | −22.4 | 9309 | −58.8 |
| 9 | 0.25 | 0.25 | 0 | −0.10 | 0 | 21448 | — | 21473 | — |
|   |      |      |   |       | 2 | 20896 | −2.6 | 16363 | −23.8 |
|   |      |      |   |       | 4 | 20837 | −2.8 | 12848 | −40.2 |
|   |      |      |   |       | 6 | 19802 | −7.7 | 11526 | −46.3 |
| 10 | 0.25 | 0 | 0.25 | 0.16 | 0 | 21362 | — | 21811 | — |
|    |      |   |      |      | 2 | 21265 | −0.4 | 20325 | −6.8 |
|    |      |   |      |      | 4 | 21769 | 1.9 | 15645 | −28.3 |
|    |      |   |      |      | 6 | 20227 | −5.3 | 14492 | −33.5 |

Examples 11-14

These examples illustrate that the improvement in hydrolytic stability by addition of HALS is independent of the method that the HALS is introduced to the blend. Blends of polyesters B and polycarbonate B (70:30 ratio by weight) were melt blended along with combinations of Weston 619 (General Electric Specialty Chemicals) and Cyasorb UV-3529 (Cytec Industries, Inc). The additives were precompounded with polyester B using an 19-mm APV twin-screw extruder at 250° C., 200 RPM at a rate of 5 lbs/hr to produce the following concentrates: Concentrate A consisting of 95/5 polyester B/Weston 619, Concentrate B consisting of 95/5 polyester B/Cyasorb UV-3529, and Concentrate C consisting of 84/5/11 polyester B/Weston 619/Cyasorb UV-3529. The blends were prepared as 20-mil extrusion cast films using a 1" Killion single-screw extruder at 250° C. and 70 RPM. The films were subsequently conditioned at 70° C. and 100% relative humidity for up to 6 weeks and the molecular weight of the polyester B and polycarbonate B components determined by GPC as previously described. The results are shown in Table 3. The blends containing the phosphite stabilizer exhibit improved color (i.e. less yellow as represented by lower b*) compared to blends without stabilizer (Example 11). The blends containing the phosphite stabilizer and HALS exhibit improved hydrolytic stability compared to blends containing the phosphite (Example 12) independent of whether the phosphite and HALS are delivered to the blend via separate concentrates (Example 13) or a single concentrate (Example 14).

measured difference is smaller because the films are much thinner. These examples are consistent with the literature cited previously that hydrolysis of phosphorus-containing catalyst quenchers is a prerequisite for effective catalyst deactivation and consequently improving blend color during melt blending. It is believed that combining the HALS and phosphite in the same concentrate reduces hydrolysis of the phosphite making it less effective for deactivating the catalyst and improving blend color.

TABLE 4

| Example | Concentrate Reference | Weston 619 (wt %) | Tinuvin 770 (wt %) | CIE Color b* |
|---|---|---|---|---|
| 15 | Weston 619 Only from Concentrate D | 0 0.05 0.15 0.25 | None | 4.32 ± 0.084 1.42 ± 0.084 0.70 ± 0.071 0.54 ± 0.055 |

TABLE 3

| Example | Weston 619 (wt %) | Cyasorb 3529 (wt %) | Color b* | Time @ 70° C. & 100% RH | polyester B Mw | ΔMw (%) | poly-carbonate B Mw | ΔMw (%) |
|---|---|---|---|---|---|---|---|---|
| 11 | 0 | 0 | 0.87 | 0 | 26971 | — | 23292 | — |
|  |  |  |  | 2 | 27940 | 3.6 | 22421 | −3.7 |
|  |  |  |  | 4 | 26708 | 2.7 | 20769 | −10.8 |
|  |  |  |  | 6 | 28158 | 6.4 | 18652 | −19.9 |
| 12 | 0.15 By Concentrate A | 0 | −0.22 | 0 | 26495 | — | 21852 | — |
|  |  |  |  | 2 | 24118 | −8.9 | 16423 | −24.8 |
|  |  |  |  | 4 | 21929 | −14.1 | 10948 | −49.9 |
|  |  |  |  | 6 | 23437 | −9.8 | 9614 | −56.0 |
| 13 | 0.15 By Concentrate A | 0.33 By Concentrate B | −0.01 | 0 | 27238 | — | 20521 | — |
|  |  |  |  | 2 | 27281 | 0.2 | 17424 | −15.1 |
|  |  |  |  | 4 | 26001 | −1.0 | 14267 | −30.5 |
|  |  |  |  | 6 | 28498 | 6.6 | 12687 | −38.2 |
| 14 | 0.15 By Concentrate C | 0.33 By Concentrate C | −0.19 | 0 | 28128 | — | 21558 | — |
|  |  |  |  | 2 | 27864 | 0.9 | 18767 | −12.9 |
|  |  |  |  | 4 | 26851 | −1.0 | 14757 | −31.5 |
|  |  |  |  | 6 | 28680 | 3.9 | 13922 | −35.4 |

Examples 15-17

These examples illustrate that adding the phosphite catalyst quencher and HALS to blends via separate concentratres may be preferred for better blend color. Blends of polyester B and polycarbonate B (70:30 ratio by weight) were melt blended along with combingations of Weston 619 (General Electric Specialty Chemicals) and Tinuvin 770 (A HALS supplied by from Ciba Specialty Chemicals). Tinuvin 770 is believed to have a formula consistent with formula (9) wherein $R_4=R_5=R_6=R_7$=methyl; $R_8$=hydrogen; $Y_2-L_1-Y_2-$ is —OC(O)—$(CH_2)_8$—(O)CO—. The additives were precompounded with polyester B using a 30-mm WP twin-screw extruder at 250° C., 250 RPM at a rate of 40 lbs/hr to produce the following concentrates: Concentrate D consisting of 95/5 polyester B/Weston 619, Concentrate E consisting of 95/5 polyester B/Tinuvin 770, and Concentrate F consisting of 91.7/5/3.3 polyester B/Weston 619/Tinuvin 770. The blends were prepared as 100-mil thick injection molded plaques using a Toyo Ti-90G2 molding machine at 275° C. The color for the plaques with various combinations of the Weston 619 and the Tinuvin 770 are given in Table 4. The examples show the improved color (i.e. lower b*) for blends with increasing phosphite concentration. The examples show that using separate concentrates for the phosphite and the HALS is preferred for better color (i.e. less yellow represented by lower b*). The same effect is observed in Examples 13 and 14 although the TABLE 4-continued

| Example | Concentrate Reference | Weston 619 (wt %) | Tinuvin 770 (wt %) | CIE Color b* |
|---|---|---|---|---|
| 16 | Weston 619 via and Tinuvin 770 via Concentrate E | 0 0.05 0.15 0.25 | 0 0.033 0.099 0.165 | 4.32 ± 0.084 1.50 ± 0.100 0.86 ± 0.055 0.84 ± 0.055 |
| 17 | Weston 619 and Tinuvin 770 via Concentrate F | 0 0.15 0.25 0.5 | 0 0.099 0.165 0.33 | 4.32 ± 0.084 2.14 ± 0.055 1.82 ± 0.045 2.08 ± 0.110 |

Examples 18-19

Improved Weatherability

These examples illustrate the synergistic improvement in weathering for polycarbonate-polyester blends containing both a phosphite catalyst quencher and a HALS. Blends of polyester B and polycarbonate B (70:30 blend ratio by weight) were melt blended along with combinations of Weston 619 (a phosphite supplied by General Electric Specialty Chemicals), Cyasorb UV-3529 (a HALS supplied by Cytec Industries, Inc.), and an ultraviolet light absorber tradename Tinuvin 1577 from Ciba Specialty Chemicals. The additives were precompounded with polyester B using a 30-mm WP twin-screw extruder at 250° C., 250 RPM at a rate of 40 lbs/hr to produce concentrates. The blends were prepared as sheet consisting of a core layer and two coextruded cap layers. The core layer of the sheet was approximately 114 mils thick and consisted of 3:1 ratio by weight polyester B:polycarbonate B and 0.15% Weston 619. The core layer was extruded using a 2.5-inch MPM extruder at 240° C. and 30 RPM. The cap layers were each 3 mils thick coextruded onto each surface of the core layer and consisted of 70:30 ratio by weight polyester B:polycarbonate B and the additive concentrations described below. The cap layers were extruded using a 1.25-inch Killion extruder at 240° C. and 30 RPM. The sheet samples were tested for weatherability by exposure in a Weather-Ometer as described previously. The samples were periodically tested for changes in color, haze, and impact strength as described previously. The results are shown in Table 5. The composition that includes the HALS (Example 19) exhibits significantly better retention of color (i.e. less yellowing represented by less increase in b*), light transmission (i.e. lower haze) and impact strength compared to the composition with phosphite and ultraviolet light absorber (Example 18) demonstrating improved weatherability.

TABLE 5

| Example | Additive Concentrations In Cap Layer (wt %) | UV Exposure (kJ/m²/nm) | Change in b* | Change in Haze | Change in Impact Strength (%) |
|---|---|---|---|---|---|
| 18 | 0.15% Weston 619 | 1000 | 1.08 | 2.7 | −93.2 |
|  |  | 2000 | 1.71 | 5.9 | −97.5 |
|  | 2.5% Tinuvin 1577 | 3000 | 1.55 | 9.1 | −99.0 |
| 19 | 0.15% Weston 619 | 1000 | 0.88 | 0.9 | −1.7 |
|  |  | 2000 | 1.13 | 1.4 | −3.1 |
|  | 0.5% Cyasorb 3529 | 3000 | 1.24 | 2.0 | −3.9 |
|  | 2.5% Tinuvin 1577 |  |  |  |  |

The invention has been described in detail with particular reference to preferred embodiments thereof, but it will be understood that variations and modifications can be effected within the spirit and scope of the invention.

We claim:

1. A polymer blend comprising a mixture of:
   (A) at least one polyester prepared by the reaction of at least one diol with at least one dicarboxylic acid or dialkyl ester thereof in the presence of a metallic catalyst;
   (B) at least one phosphorus-containing compound;
   (C) at least one hindered amine light stabilizer; and
   (D) at least one polycarbonate,
   wherein the phosphorus-containing compound is selected from the formulas (1)-(6):

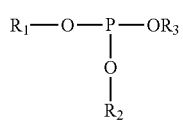

(1)

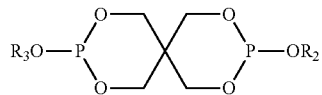

(2)

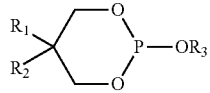

(3)

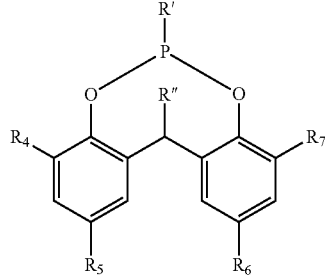

(4)

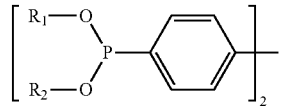

(5)

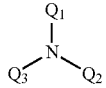

(6)

wherein
R$_1$, R$_2$ and R$_3$ are independently selected from the group consisting of C$_1$-C$_{22}$-alkyl, substituted C$_1$-C$_{22}$-alkyl, C$_3$-C$_8$-cycloalkyl, substituted C$_3$-C$_8$-cycloalkyl, and heteroaryl;
R' is selected from the group consisting of halogen and OR$_1$;
R", R$_4$, R$_5$, R$_6$, and R$_7$ are independently selected from the group consisting of hydrogen, C$_1$-C$_{22}$-alkyl, substituted C$_1$-C$_{22}$-alkyl, C$_3$-C$_8$-cycloalkyl, substituted C$_3$-C$_8$-cycloalkyl, heteroaryl, and aryl; and
each Q$_1$, Q$_2$ and Q$_3$ group independently is radical A, wherein radical A has the following structure:

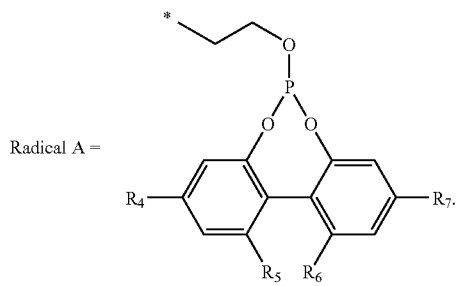

2. The polymer blend according to claim 1 wherein the at least one polyester comprises:
   (1) diacid residues comprising at least 50 mole percent of terephthalic acid residues, cyclohexanedicarboxylic acid residues or a mixture thereof; and
   (2) diol residues comprising at least 50 mole percent of ethylene glycol residues, cyclohexanedimethanol residues, or a mixture thereof;

wherein the total of the diacid residues is equal to 100 mole percent and the total of the diol residues also is equal to 100 mole percent.

3. The polymer blend according to claim 2 wherein the polyester comprises up to about 200 ppmw of Ti, Co, or Mn residues, or combinations thereof.

4. A polymer blend comprising:
(A) at least one polyester comprising:
(1) diacid residues comprising at least 50 mole percent of residue of a diacid selected from the group consisting of 1,4-cyclohexanedicarboxylic acid, terephthalic acid and isophthalic acid or a mixture thereof; and
(2) diol residues comprising at least 50 mole percent of ethylene glycol residues, cyclohexanedimethanol residues, or a mixture thereof;
based on a total of 100 mole percent of diacid residues and a total of 100 mole percent of diol residues;
(B) 0.01 to 0.5 weight percent of at least one phosphorus-containing compound based on the total weight of the blend;
(C) 0.01 to 1.0 weight percent of at least one hindered amine light stabilizer based on the total weight of the blend, wherein the at least one hindered amine light stabilizer is selected from the following formulae:

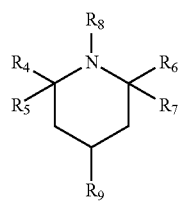
(7)

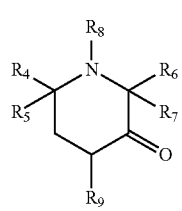
(8)

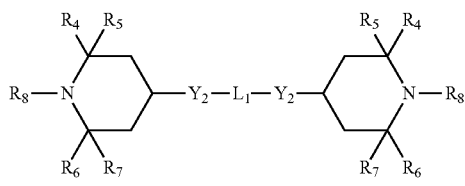
(9)

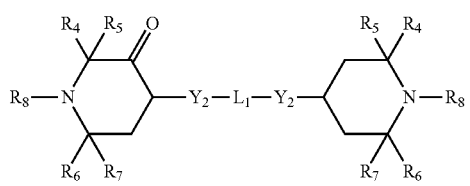
(10)

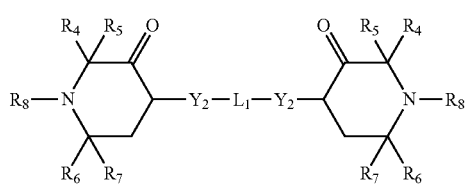
(11)

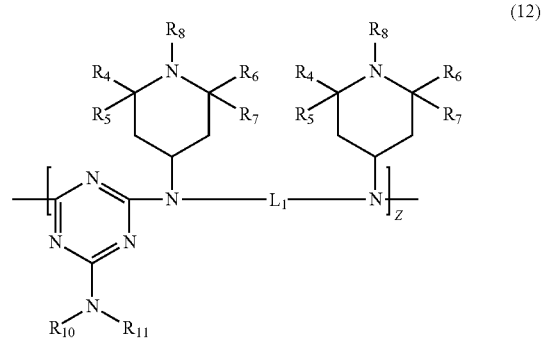
(12)

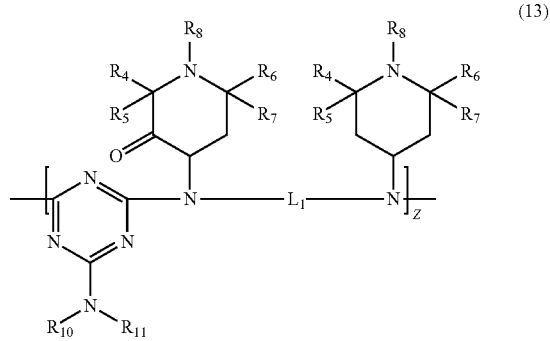
(13)

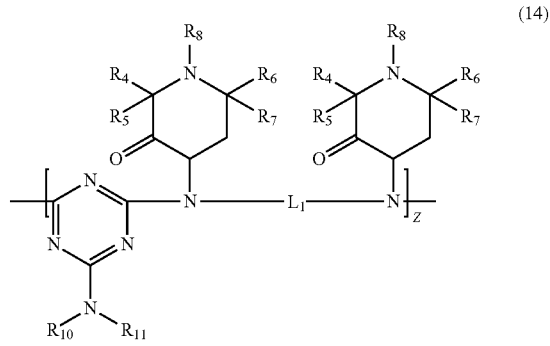
(14)

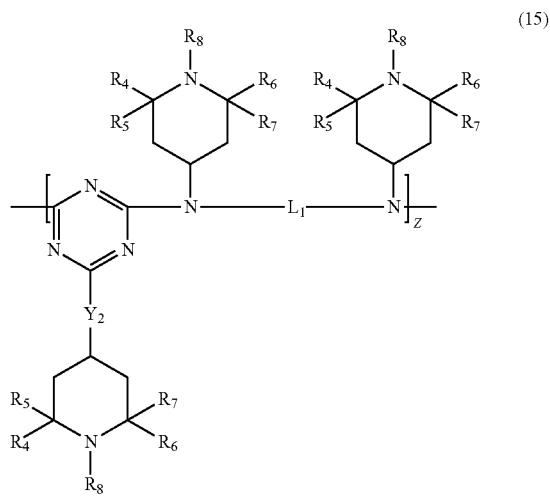
(15)

wherein

R$_4$, R$_5$, R$_6$, and R$_7$ are independently selected from the group consisting of hydrogen, C$_1$-C$_{22}$-alkyl, substituted C$_1$-C$_{22}$-alkyl, C$_3$-C$_8$-cycloalkyl, substituted C$_3$-C$_8$-cycloalkyl, heteroaryl, and aryl;

R$_8$ is selected from the group consisting of hydrogen, —OR$_6$, C$_1$-C$_{22}$-alkyl, substituted C$_1$-C$_{22}$-alkyl, C$_3$-C$_8$-cycloalkyl, and substituted C$_3$-C$_8$-cycloalkyl;

R$_9$ is selected from the group consisting of hydrogen, C$_1$-C$_{22}$-alkyl, substituted C$_1$-C$_{22}$-alkyl, C$_3$-C$_8$-cycloalkyl, substituted C$_3$-C$_8$-cycloalkyl, heteroaryl, aryl, —Y$_1$—R$_4$, and a succinimido group having the formula:

R$_{10}$ and R$_{11}$ are independently selected from the group consisting of hydrogen, C$_1$-C$_{22}$-alkyl, substituted C$_1$-C$_{22}$-alkyl, C$_3$-C$_8$-cycloalkyl, and substituted C$_3$-C$_8$-cycloalkyl;

R$_{10}$ and R$_{11}$ collectively may represent a divalent group forming a ring with the nitrogen atom to which they are attached;

L$_1$ is a divalent linking group selected from the group consisting of C$_2$-C$_{22}$-alkylene, —(CH$_2$CH$_2$—Y$_1$)$_{1-3}$—CH$_2$CH$_2$—, C$_3$-C$_8$-cycloalkylene, arylene, and —CO-L$_2$-OC—;

L$_2$ is selected from the group consisting of C$_1$-C$_{22}$-alkylene, arylene, —(CH$_2$CH$_2$—Y$_1$)$_{1-3}$—CH$_2$CH$_2$—, and C$_3$-C$_8$-cycloalkylene;

Y$_1$ is selected from the group consisting of —OC(O)—, —NHC(O)—, —O—, —S—, and —N(R$_4$)—;

V$_2$ is selected from the group consisting of —O— and —N(R$_4$)—;

Z is a positive integer of up to about 20;

m1 is selected from 0 to about 10;

n1 is a positive integer selected from 2 to about 12;

R$_{12}$ and R$_{13}$ are independently selected from the group consisting of hydrogen, C$_1$-C$_{22}$-alkyl, substituted C$_1$-C$_{22}$-alkyl, heteroaryl, aryl, and radical B wherein radical B is selected from the following structures:

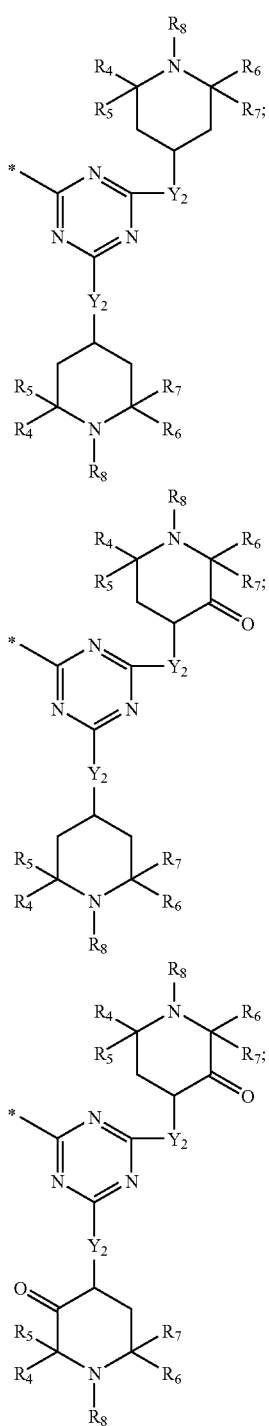

wherein * designates the position of attachment and wherein at least one of $R_{12}$ and $R_{13}$ is radical B; and (D) at least one polycarbonate, wherein the phosphorus-containing compound is selected from the formulas (1)-(6):

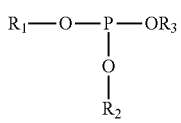

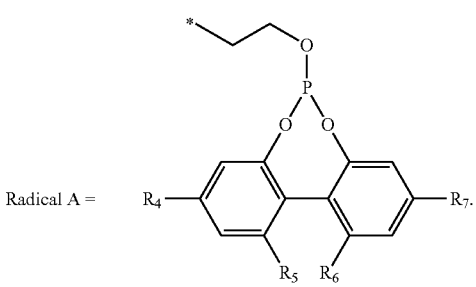

wherein
- $R_1$, $R_2$ and $R_3$ are independently selected from the group consisting of $C_1$-$C_{22}$-alkyl, substituted $C_1$-$C_{22}$-alkyl, $C_3$-$C_8$-cycloalkyl, substituted $C_3$-$C_8$-cycloalkyl, and heteroaryl;
- R' is selected from the group consisting of halogen and $OR_1$;
- R", $R_4$, $R_5$ $R_6$, and $R_7$ are independently selected from the group consisting of hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl; and
- each $Q_1$, $Q_2$ and $Q_3$ group independently is radical A, wherein radical A has the following structure:

Radical A = [structure shown with biphenyl, P, O, O, and $R_4$, $R_5$, $R_6$, $R_7$ substituents]

5. The polymer blend of claim 4 wherein $R_8$ is hydrogen, $C_1$-$C_{22}$-alkyl, substituted $C_1$-$C_{22}$-alkyl, $C_3$-$C_8$-cycloalkyl, or substituted $C_3$-$C_8$-cycloalkyl.

6. The polymer blend of claim 5 wherein the polyester of component (A) has an inherent viscosity of about 0.4 to 1.2 dL/g measured at 25° C. in a 60/40 ratio by weight of phenol/tetrachloroethane and comprises:

(1) diacid residues comprising about 80 to 100 mole percent of terephthalic acid residues and about 0 to 20 mole percent of isophthalic acid residues; and (2) diol residues comprising about 40 to 100 mole percent of 1,4-cyclohexanedimethanol residues and 0 to about 60 mole percent of ethylene glycol residues and component (B) comprises 0.05 to 0.5 weight percent of at least one phosphorus-containing compound and component (C) comprises 0.05 to 1.0 weight percent of at least one hindered amine light stabilizer based on the total weight of the composition.

7. The polymer blend of claim 6 wherein the polyester of component (A) has an inherent viscosity of about 0.4 to 0.8 dL/g measured at 25° C. in a 60/40 ratio by weight of phenol/tetrachloroethane and comprises:
   (1) diacid residues comprising about 80 to 100 mole percent of terephthalic acid residues and about 0 to 20 mole percent of isophthalic acid residues; and
   (2) diol residues comprising about 55 to 80 mole percent of 1,4-cyclohexanedimethanol residues and about 20 to about 45 mole percent of ethylene glycol residues.

8. The polymer blend of claim 4 wherein the polyester of component (A) has an inherent viscosity of about 0.4 to 0.8 dL/g measured at 25° C. in a 60/40 ratio by weight of phenol/tetrachloroethane and comprises:
   (1) diacid residues comprising about 65 to 83 mole percent of terephthalic acid residues and about 35 to 17 mole percent of isophthalic acid residues; and
   (2) diol residues comprising about 80 to 100 mole percent of 1,4-cyclohexane-dimethanol residues and about 0 to about 20 mole percent of ethylene glycol residues.

9. The polymer blend of claim 8 wherein the polyester of component (A) comprises:
   (1) diacid residues comprising about 70 to 80 mole percent of terephthalic acid residues and about 30 to 20 mole percent of isophthalic acid residues; and
   (2) diol residues comprising about 90 to 100 mole percent of 1,4-cyclohexanedimethanol residues and 0 to about 10 mole percent of ethylene glycol residues.

10. The polymer blend of claim 4 wherein the polyester of component (A) has an inherent viscosity of about 0.4 to 1.2 dL/g measured at 25° C. in a 60/40 ratio by weight of phenol/tetrachloroethane and comprises:
    (1) diacid residues comprising at least about 80 mole percent of 1,4-cyclohexanedicarboxylic acid residues; and
    (2) diol residues comprising at least about 80 mole percent of 1,4-cyclohexane-dimethanol residues.

11. The polymer blend of claim 10 wherein the polyester of component (A) comprises:
    (1) diacid residues comprising about 90 to 100 mole percent of 1,4-cyclohexanedicarboxylic acid residues; and
    (2) diol residues comprising about 90 to 100 mole percent of 1,4-cyclohexane-dimethanol residues.

12. The polymer blend of claim 11 wherein the polyester of component (A) comprises:
    (1) diacid residues comprising about 100 mole percent of 1,4-cyclohexanedicarboxylic acid residues; and
    (2) diol residues comprising about 100 mole percent of 1,4-cyclohexanedimethanol residues.

13. A polymer blend comprising a mixture of the following:
    (A) at least one polyester having an inherent viscosity of about 0.4 to 1.2 dL/g measured at 25° C. in a 60/40 ratio by weight of phenol/tetrachloroethane and comprising:
        (1) diacid residues comprising at least about 50 mole percent of residue of a diacid selected from the group consisting of 1,4-cyclohexanedicarboxylic acid, terephthalic acid and isophthalic acid or a mixture thereof; and
        (2) diol residues comprising at least about 50 mole percent of ethylene glycol residues, cyclohexanedimethanol residues, or a mixture thereof;
    (B) about 0.1 to 0.5 weight percent of at least one phosphorus-containing compound based on the total weight of the composition;
    (C) about 0.1 to 1.0 weight percent of at least one hindered amine light stabilizer based on the total weight of the composition having the formulas:

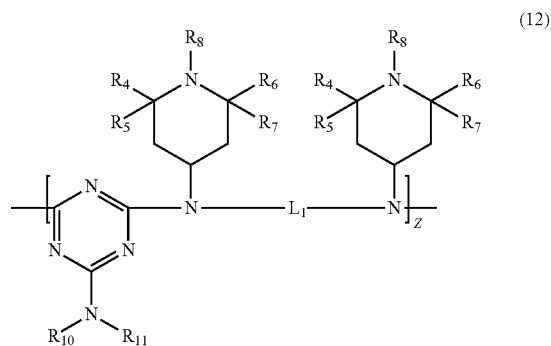

(12)

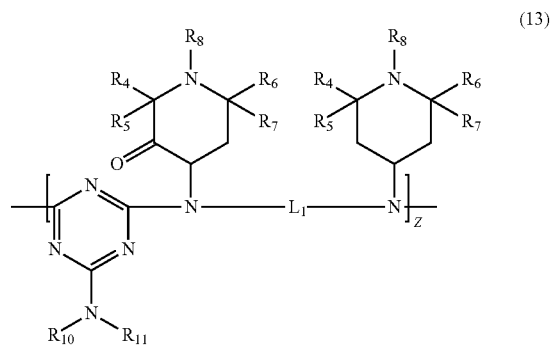

(13)

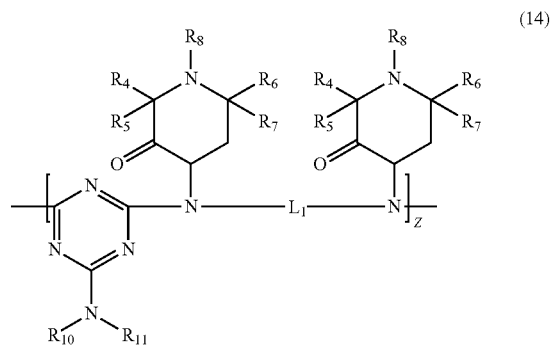

(14)

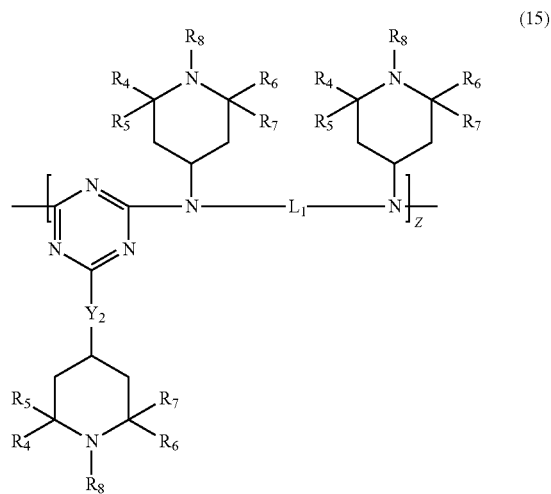

(15)

-continued (16)

(17)

(18)

(19)

wherein

R$_4$, R$_5$ R$_6$, and R$_7$ are independently selected from the group consisting of hydrogen, C$_1$-C$_{22}$-alkyl, substituted C$_1$-C$_{22}$-alkyl, C$_3$-C$_8$-cycloalkyl, substituted C$_3$-C$_8$-cycloalkyl, heteroaryl, and aryl;

R$_8$ is selected from the group consisting of hydrogen, —OR$_6$, C$_1$-C$_{22}$-alkyl, substituted C$_1$-C$_{22}$-alkyl, C$_3$-C$_8$-cycloalkyl, and substituted C$_3$-C$_8$-cycloalkyl;

R$_{10}$ and R$_{11}$ are independently selected from the group consisting of hydrogen, C$_1$-C$_{22}$-alkyl, substituted C$_1$-C$_{22}$-alkyl, C$_3$-C$_8$-cycloalkyl, and substituted C$_3$-C$_8$-cycloalkyl;

R$_{10}$ and R$_{11}$ collectively may represent a divalent group forming a ring with the nitrogen atom to which they are attached;

L$_1$ is a divalent linking group selected from the group consisting of C$_2$-C$_{22}$-alkylene, —(CH$_2$CH$_2$—Y$_1$)$_{1-3}$—CH$_2$CH$_2$—, C$_3$-C$_8$-cycloalkylene, arylene, and —CO-L$_2$-OC—;

Y$_2$ is selected from the group consisting of —O— and —N(R$_4$)—;

Z is a positive integer of up to about 20;

m1 is selected from 0 to about 10;

n1 is a positive integer selected from 2 to about 12;

R$_{12}$ and R$_{13}$ are independently selected from the group consisting of hydrogen, C$_1$-C$_{22}$-alkyl, substituted C$_1$-C$_{22}$-alkyl, heteroaryl, aryl, and radical B wherein radical B is selected from the following structures:

-continued

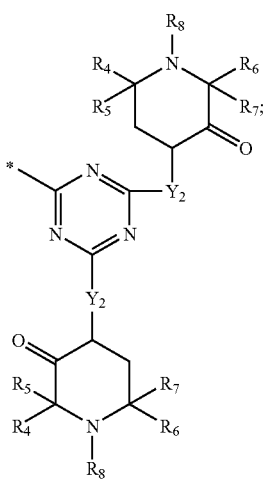

wherein * designates the position of attachment and wherein at least one of $R_{12}$ and $R_{13}$ is radical B; and (D) at least one polycarbonate, wherein the phosphorus-containing compound is selected from the formulas (1)- (6):

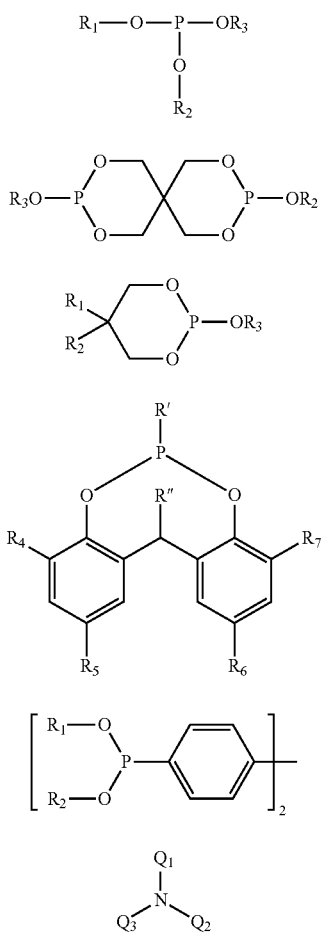

wherein
$R_1$, $R_2$ and $R_3$ are independently selected from the group consisting of $C_1$-$C_{22}$-alkyl, substituted $C_1$-$C_{22}$-alkyl, $C_3$-$C_8$-cycloalkyl, substituted $C_3$-$C_8$-cycloalkyl, and heteroaryl;
R' is selected from the group consisting of halogen and $OR_1$;
R", $R_4$, $R_5$ $R_6$, and $R_7$ are independently selected from the group consisting of hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl; and
each $Q_1$, $Q_2$ and $Q_3$ group independently is radical A, wherein radical A has the following structure:

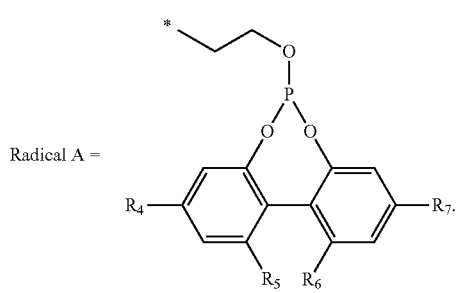

Radical A =

14. The polymer blend of claim 13 wherein $R_8$ is hydrogen, $C_1$-$C_{22}$-alkyl, substituted $C_1$-$C_{22}$-alkyl, $C_3$-$C_8$-cycloalkyl, or substituted $C_3$-$C_8$-cycloalkyl for the hindered amine light stabilizer.

15. The polymer blend of claim 13 wherein the at least one hindered amine light stabilizer contains an $sp^3$-hybridized nitrogen atom that is not contained within the substituted piperidine ring.

16. The polymer blend of claim 13 wherein the at least one hindered amine light stabilizer has a weight average molecular weight of greater than 1000.

17. The polymer blend of claim 13 wherein the phosphorus-containing compound is selected from the group consisting of bis(2,4-di-t-butylphenyl)pentaerythritol diphosphite, distearyl pentaerythritol diphosphite, and bis-(2,4-dicumylphenyl)pentaerythritol diphosphite.

18. The polymer blend of claim 17 wherein said phosphorus-containing compound is distearyl pentaerythritol diphosphite.

19. The polymer blend of claim 17 comprising from about 0.15 to 0.35 weight percent of the phosphorus-containing compound and from 0.1 to about 0.75 weight percent of the hindered amine light stabilizer, based on the total weight of the polymer blend.

20. The polymer blend of claim 13 wherein the polyester of component (A) has an inherent viscosity of about 0.4 to 0.8 dL/g measured at 25° C. in a 60/40 ratio by weight of phenol/tetrachloroethane and comprises:
  (1) diacid residues comprising about 80 to 100 mole percent of terephthalic acid residues and about 0 to 20 mole percent of isophthalic acid residues; and
  (2) diol residues comprising about 40 to 100 mole percent of 1,4-cyclohexane-dimethanol residues and about 0 to about 60 mole percent of ethylene glycol residues.

21. The polymer blend of claim 13 wherein the polyester of component (A) has an inherent viscosity of about 0.4 to 0.8 dL/g measured at 25° C. in a 60/40 ratio by weight of phenol/tetrachloroethane and comprises:
  (1) diacid residues comprising about 80 to 100 mole percent of terephthalic acid residues and about 0 to 20 mole percent of isophthalic acid residues; and (2) diol residues comprising about 55 to 80 mole percent of 1,4-cyclohexanedimethanol residues and about 20 to about 45 mole percent ethylene glycol residues.

22. The polymer blend of claim 13 wherein the polyester of component (A) has an inherent viscosity of about 0.4 to 0.8 dL/g measured at 25° C. in a 60/40 ratio by weight of phenol/tetrachloroethane and comprises:
(1) diacid residues comprising about 65 to 83 mole percent of terephthalic acid residues and about 35 to 17 mole percent of isophthalic acid residues; and
(2) diol residues comprising about 80 to 100 mole percent of 1,4-cyclohexane-dimethanol residues and about 0 to about 20 mole percent of ethylene glycol residues.

23. The polymer blend of claim 22 wherein the polyester of component (A) comprises:
(1) diacid residues comprising about 70 to 80 mole percent of terephthalic acid residues and about 30 to 20 mole percent of isophthalic acid residues; and
(2) diol residues comprising about 90 to 100 mole percent of 1,4-cyclohexanedimethanol residues and 0 to about 10 mole percent of ethylene glycol residues.

24. The polymer blend of claim 13 wherein the polyester of component (A) has an inherent viscosity of about 0.4 to 1.2 dL/g measured at 25° C. in a 60/40 ratio by weight of phenol/tetrachloroethane and comprises:
(1) diacid residues comprising at least about 80 mole percent of 1,4-cyclohexanedicarboxylic acid residues; and
(2) diol residues comprising at least about 80 mole percent of 1,4-cyclohexane-dimethanol residues.

25. The polymer blend of claim 24 wherein the polyester of component (A) comprises:
(1) diacid residues comprising about 90 to 100 mole percent of 1,4-cyclohexanedicarboxylic acid residues; and
(2) diol residues comprising about 90 to 100 mole percent of 1,4-cyclohexane-dimethanol residues.

26. The polymer blend of claim 25 wherein the polyester of component (A) comprises:
(1) diacid residues comprising about 100 mole percent of 1,4-cyclohexanedicarboxylic acid residues; and
(2) diol residues comprising about 100 mole percent of 1,4-cyclohexanedimethanol residues.

27. A polymer blend comprising a mixture of:
(A) at least one polyester having an inherent viscosity of about 0.4 to 1.2 dL/g measured at 25° C. in a 60/40 ratio by weight of phenol/tetrachloroethane and comprises:
(1) diacid residues comprising at least about 50 mole percent of terephthalic acid residues, cyclohexanedicarboxylic acid residues or a mixture thereof; and
(2) diol residues comprising at least about 50 mole percent of ethylene glycol residues, cyclohexanedimethanol residues, or a mixture thereof;
wherein the total mole percentages of diacid residues is 100 mole percent and the total mole percentages of diol residues is 100 mole percent; and
(B) about 0.1 to 0.5 weight percent of at least one phosphorus-containing compound selected from the group of bis(2,4-di-t-butylphenyl)pentaerythritol diphosphite, distearyl pentaerythritol diphosphite, and bis-(2,4-dicumylphenyl)pentaerythritol diphosphite, based on the total weight of the blend;
(C) about 0.1 to 1.0 weight percent of at least one hindered amine light stabilizer based on the total weight of the composition having the formula:

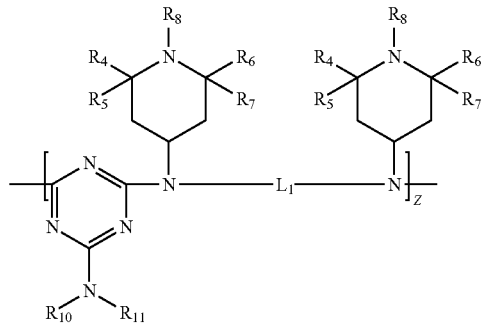

(12)

wherein $R_4=R_5=R_6=R_7=R_8=$methyl, $(R_{10})(R_{11})$N— collectively represent morpholino, $L_1$ is $C_1$ to $C_6$ alkylene, and Z is 1 to 6; and
(D) at least one polycarbonate.

28. The polymer blend of claim 27 comprising from about 0.15 to 0.35 weight percent of the phosphorus-containing compounds and from 0.1 to about 0.75 weight percent of the hindered amine light stabilizer, based on the total weight of the polymer blend.

29. The polymer blend according to claim 27 wherein the polyester of component (A) comprises:
(1) diacid residues comprising about 80 to 100 mole percent of terephthalic acid residues and about 0 to 20 mole percent of isophthalic acid residues; and
(2) diol residues comprising about 55 to 80 mole percent of 1,4-cyclohexanedimethanol residues and about 20 to 45 mole percent of ethylene glycol residues;
wherein the total of the diacid residues is equal to 100 mole percent and the total of the diol residues also is equal to 100 mole percent.

30. The polymer blend according to claim 27 wherein the polyester of component (A) comprises:
(1) diacid residues comprising about 70 to 80 mole percent of terephthalic acid residues and about 30 to 20 mole percent of isophthalic acid residues; and
(2) diol residues comprising about 90 to 100 mole percent of 1,4-cyclohexanedimethanol residues and about 0 to 10 mole percent of ethylene glycol residues;
wherein the total of the diacid residues is equal to 100 mole percent and the total of the diol residues also is equal to 100 mole percent.

31. The polymer blend according to claim 27 wherein the polyester of component (A) comprises:
(1) diacid residues comprising at least about 90 mole percent of 1,4-cyclohexanedicarboxylic acid residues; and
(2) diol residues comprising at least about 90 mole percent of 1,4-cyclohexanedimethanol residues;
wherein the total of the diacid residues is equal to 100 mole percent and the total of the diol residues also is equal to 100 mole percent.

32. The polymer blend of claim 27 wherein said phosphorus-containing compound is distearyl pentaerythritol diphosphite.

33. The polymer blend of claim 1 wherein the polycarbonate is derived from bisphenol A.

34. The polymer blend of claim 4 wherein the polycarbonate is derived from bisphenol A.

35. The polymer blend of claim 13 wherein the polycarbonate is derived from bisphenol A.

36. The polymer blend of claim 27 wherein the polycarbonate is derived from bisphenol A.

37. A polymer blend comprising:
(A) at least one polyester;
(B) at least one phosphorus-containing compound;
(C) at least one hindered amine light stabilizer; and
(D) at least one polycarbonate,
wherein the phosphorus-containing compound and the hindered amine light stabilizer are added to the blend via separate concentrates.

* * * * *

UNITED STATES PATENT AND TRADEMARK OFFICE
CERTIFICATE OF CORRECTION

PATENT NO.        : 8,093,316 B2                                Page 1 of 1
APPLICATION NO.   : 10/772121
DATED             : January 10, 2012
INVENTOR(S)       : Pearson et al.

It is certified that error appears in the above-identified patent and that said Letters Patent is hereby corrected as shown below:

Correction(s):

Column 28, Line 57:

"$V_2$ is selected from..."

should be

"$Y_2$ is selected from..."

Signed and Sealed this
Thirteenth Day of March, 2012

David J. Kappos
*Director of the United States Patent and Trademark Office*